US012214821B2

(12) United States Patent
Thompson et al.

(10) Patent No.: US 12,214,821 B2
(45) Date of Patent: Feb. 4, 2025

(54) DRIVE SYSTEM FOR A SKID STEERED VEHICLE

(71) Applicant: QinetiQ Limited, Hampshire (GB)

(72) Inventors: Robert William Thompson, Camberley (GB); Robert John Bonner Flaxman, Guildford (GB)

(73) Assignee: RENK America LLC, Muskegon, MI (US)

( * ) Notice: Subject to any disclaimer, the term of this patent is extended or adjusted under 35 U.S.C. 154(b) by 0 days.

(21) Appl. No.: 17/792,759

(22) PCT Filed: Jan. 14, 2021

(86) PCT No.: PCT/EP2021/050677
§ 371 (c)(1),
(2) Date: Jul. 14, 2022

(87) PCT Pub. No.: WO2021/144355
PCT Pub. Date: Jul. 22, 2021

(65) Prior Publication Data
US 2023/0039208 A1    Feb. 9, 2023

(30) Foreign Application Priority Data

Jan. 14, 2020  (GB) ...................... 2000518

(51) Int. Cl.
*B62D 11/16*    (2006.01)
*B60K 17/12*    (2006.01)
(Continued)

(52) U.S. Cl.
CPC .............. *B62D 11/16* (2013.01); *B60K 17/12* (2013.01); *B60K 17/16* (2013.01); *B62D 11/04* (2013.01);
(Continued)

(58) Field of Classification Search
CPC ........ B60K 17/12; B60K 17/16; B60K 28/16; B60K 2007/0061; B60K 1/02;
(Continued)

(56) References Cited

U.S. PATENT DOCUMENTS 6,342,021 B1    1/2002  Gleasman et al.
8,672,790 B2 *  3/2014  Severinsson ............ F16H 48/36
                                                                475/5

(Continued)

FOREIGN PATENT DOCUMENTS

DE        744404 C    1/1944
GB        332302 A    7/1930
(Continued)

OTHER PUBLICATIONS

International Search Report for PCT Patent App. No. PCT/EP2021/050677 (Jun. 9, 2021).
(Continued)

*Primary Examiner* — Tinh Dang
(74) *Attorney, Agent, or Firm* — Dorton & Willis, LLP

(57) ABSTRACT

Gearboxes for a skid steered vehicle including layouts in which all electric propulsion drive motors and electric steering motors are located on one side of the gearbox, and layouts in which the drive inputs of the electric propulsion drive motors are located face to face. Gear change units and gear packaging configurations suitable for such gearboxes.

13 Claims, 25 Drawing Sheets

(51) Int. Cl.
*B60K 17/16* (2006.01)
*B62D 11/04* (2006.01)
*F16H 48/10* (2012.01)
*F16H 57/023* (2012.01)

(52) U.S. Cl.
CPC ..... *F16H 48/10* (2013.01); *F16H 2057/0235* (2013.01)

(58) Field of Classification Search
CPC .................. B60K 7/0007; F16H 48/10; F16H 2057/0235; F16H 3/091; F16H 2003/0803; F16H 2048/364; F16H 48/05; F16H 3/089; F16H 2200/0021; F16H 2200/0034; F16H 57/023; B62D 11/16; B62D 11/10; B60Y 2200/25; B60Y 2400/85; B60Y 2200/09
See application file for complete search history.

(56) References Cited

U.S. PATENT DOCUMENTS

| | | | | |
|---|---|---|---|---|
| 9,975,576 | B2* | 5/2018 | Flaxman | ................ B62D 11/14 |
| 2005/0115346 | A1* | 6/2005 | Sakamoto | ............... F16H 3/126 |
| | | | | 74/335 |
| 2006/0258502 | A1 | 11/2006 | Bader | |
| 2007/0213160 | A1 | 9/2007 | Lyons et al. | |
| 2008/0202826 | A1 | 8/2008 | Freudenreich | |

FOREIGN PATENT DOCUMENTS

| | | |
|---|---|---|
| GB | 949029 A | 2/1964 |
| GB | 1501757 A | 2/1978 |
| SU | 1278255 A1 | 12/1986 |
| WO | 02083483 A1 | 10/2002 |
| WO | WO2014206597 A1 | 12/2014 |
| WO | 2017198356 A1 | 11/2017 |
| WO | 2018082828 A1 | 5/2018 |

OTHER PUBLICATIONS

Partial Search Report for Great Britain Patent App. No. 2000518.7 (Jul. 6, 2020) for Claims 1-6, 9, 16, 19-20, 27-29.
Partial Search Report for Great Britain Patent App. No. 2000518.7 (Apr. 13, 2021) for Claims 7-8, 10-15.
Partial Search Report for Great Britain Patent App. No. 2000518.7 (Apr. 13, 2021) for Claims 17-19, 21-29.
Written Opinion for PCT Patent App. No. PCT/EP2021/050677 (Jun. 9, 2021).
Israel Patent Office; Office Action in related Israeli Patent Application No. 294338 dated Nov. 18, 2024; 5 pages.

* cited by examiner

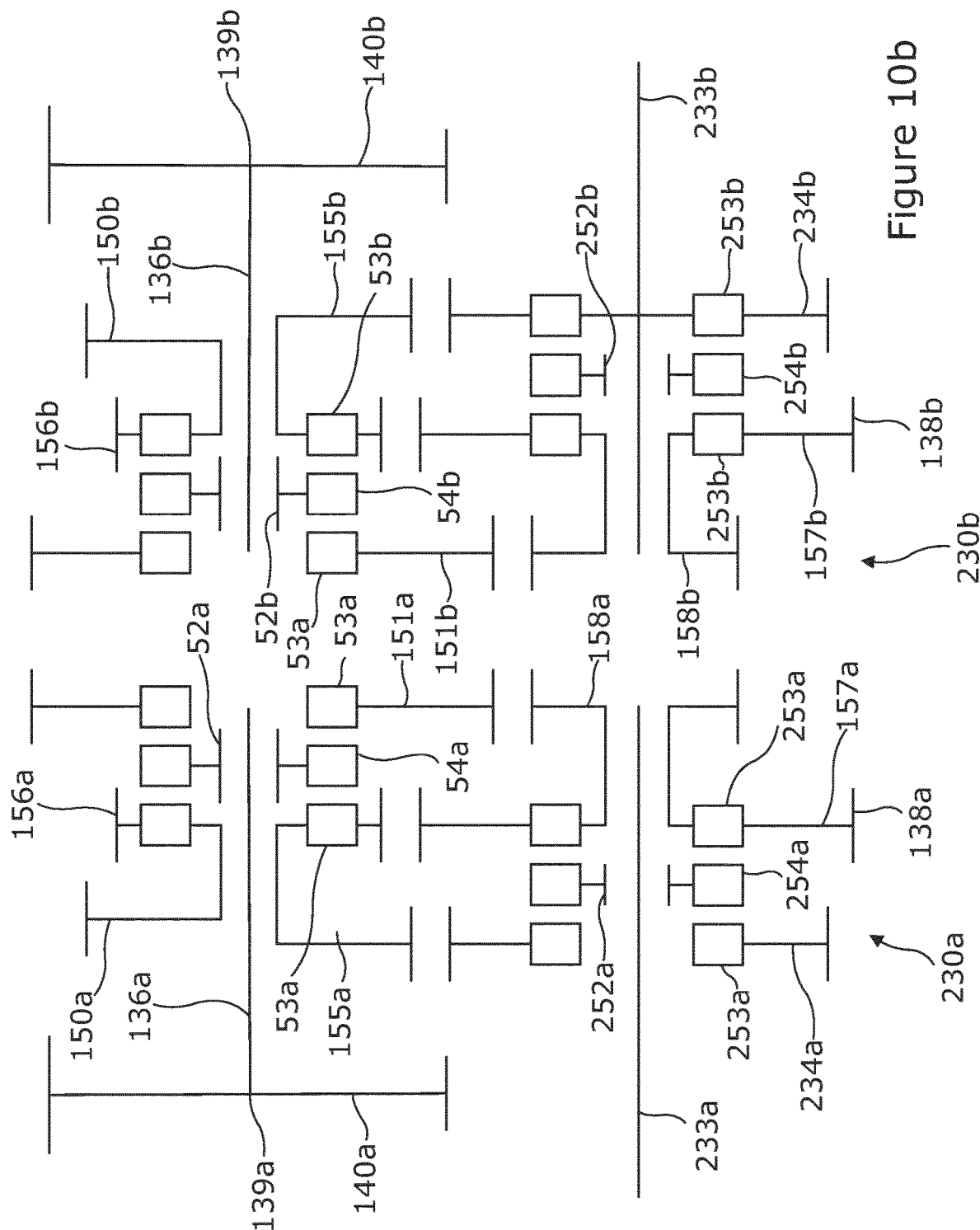

DRIVE SYSTEM FOR A SKID STEERED VEHICLE

CROSS REFERENCE TO RELATED APPLICATION(S)

This application is a national phase filing under 35 C.F.R. § 371 of and claims priority to PCT Patent Application No. PCT/EP2021/050677, filed on Jan. 14, 2021, which claims the priority benefit under 35 U.S.C. § 119 of British Patent Application Nos. 2000518.7 filed on Jan. 14, 2020 respectively, the contents of each of which are hereby incorporated by reference in their entireties.

TECHNICAL FIELD

The present disclosure relates to novel drive configurations for skid steered vehicles, including tracked or wheeled vehicles.

BACKGROUND

A skid steered tracked vehicle is steered by forcing opposite parallel tracks to run at different speeds (skid steering). Similarly, a skid steered wheeled vehicle is steered by forcing wheels on one side of the vehicle to run at different speeds to the wheels on the other side of the vehicle. For tracked vehicles to steer, large driving force differences are required between the two tracks—large braking forces on the inner track and high driving forces on the outer track. Differential gears and cross-shafts are used to control the relative speeds of the tracks and transfer the braking power from the inner track to the outer track to sustain the turn. A similar arrangement is used for a skid steered wheeled vehicle.

A number of electric track drive arrangements use a separate electric motor to drive each track, known as a "two-line" system. The regenerative steering power in such a system is generally handled electrically resulting in the need for oversized motors and power convertors to handle this power. An alternative configuration uses the same mechanical regenerative arrangement as in a conventional transmission combined with an electric drive, known as a "cross-shaft" electric drive system. In this arrangement, the steer cross-shaft runs across the vehicle outside the propulsion motor which increases the size of the assembly.

International patent application publication number WO2014/206597 discloses a drive system for a skid steered vehicle having a controlled differential configured to cause transmission of regenerative steering power through the propulsion motor shaft thereby removing the need for cross-shafts. Steer motors are mounted on a shaft which is interconnected via gears with the controlled differential, the outputs of which are in direct connection with the drive outputs of the drive system. A pair of electric propulsion motors are located on either side of the controlled differential, the electric propulsion motors being arranged to provide drive to the drive shafts via respective gear change and gear reduction units located outboard of the motors and connected to the drive shafts in a parallel connection with the outputs from the controlled differential such that the rotational speed of the drive outputs is controlled by both the outputs of the controlled differential, and the outputs of the gear reduction units. Such a drive arrangement has been found to be mechanically efficient in tests. However, the configuration is not optimised from a packaging point of view.

It is against this background that the described drive unit has been developed.

SUMMARY

The presently disclosed subject matter provides a gearbox for a skid steered vehicle, the gearbox including a housing having first and second opposing sides; a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs; a steering input shaft in driveable communication with the controlled differential, wherein one end of the steering input shaft forms a steering input to the gearbox; a propulsion input shaft in driveable communication with the gearbox outputs, wherein one end of the propulsion input shaft forms a propulsion input to the gearbox; and a gear reduction unit and optionally a gear change unit in driveable communication with the gearbox outputs, wherein the propulsion input shaft, the gear reduction unit and the optional gear change unit are connected in a parallel connection with an output of the controlled differential to the gearbox outputs, and wherein the steering input and the propulsion input are located on the same side of the gearbox housing.

By providing the steering input and the propulsion input on the same side of the gearbox, maintenance access may be simplified on the vehicle as there is no need to duplicate maintenance access design features to enable access to both sides of the gearbox.

Optionally the gearbox may include: a second propulsion input shaft in driveable communication with the gearbox outputs, wherein one end of the second propulsion input shaft forms a second propulsion input to the gearbox; and a second gear reduction unit and optionally a second gear change unit in driveable communication with the gearbox outputs, wherein the second propulsion input shaft, the second gear reduction unit and the optional second gear change unit are connected in a parallel connection with an output of the controlled differential to the gearbox outputs, and wherein the steering input, the propulsion input and the second propulsion input are located on the same side of the gearbox housing.

The provision of two propulsion inputs on the same side of the gearbox allows for the provision of more motive power to the gearbox from two propulsion motors.

The propulsion input shaft and the second propulsion input shaft may optionally be located in a common plane, wherein the steering input shaft is spaced from the common plane. This allows for the width of the drive unit (with motors attached) to be reduced as the steering motor(s) may be positioned alongside the propulsion motor(s).

The steering input and the or each propulsion input may be spaced from one another so that each steering motor and each propulsion motor may be positioned alongside one another to minimise the width of the drive unit (with motors attached).

Optionally a gearbox output is located on the same side of the gearbox as the steering input and the or each propulsion input so that the overall dimensions of the drive unit (with motors attached) may be minimised by placing the motors in the same side as a gearbox output.

The distances between the centre of the gearbox output and the centres of the steering input and the or each propulsion input may optionally be substantially equal to minimise packaging size buy placing all motors as close to the drive shafts as possible.

In another aspect, the presently disclosed subject matter provides a gearing configuration include: at least one drive shaft having a primary drive gear fixed thereto; a propulsion input shaft including a propulsion input and a propulsion input gear fixed thereto; and a gear change unit ing: a gear input shaft having first and second gears fixed thereto, wherein the first gear meshes with the propulsion input gear; a gear output shaft having a third gear fixed thereto, wherein the third gear meshes with the primary drive gear, the gear output shaft further including fourth and fifth gears each located around and supported for rotation on the gear output shaft, wherein the fourth gear meshes with the first gear and wherein the fifth gear meshes with the second gear; and a slideable dog hub operably connectable to a gear change selector, wherein the slideable dog hub is located on the gear output shaft in slideable engagement and constrained for rotation therewith, wherein the slideable dog hub is located between the fourth and fifth gears, wherein the at least one drive shaft and the gear change unit are arranged so that the circumference of the fifth gear overlaps the circumference of the primary drive gear.

The overlap of the primary drive gear and the fifth gear helps to minimise the package size of the gearing configuration.

In a further aspect, the presently disclosed subject matter provides a gearbox for a skid steered vehicle including the gearing configuration described above and: a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs; and a steering input shaft in driveable communication with the controlled differential, wherein one end of the steering input shaft forms a steering input to the gearbox, wherein the propulsion input shaft and the gear change unit are connected in a parallel connection with an output of the controlled differential to the gearbox outputs.

The gearbox described above may have the or each propulsion input and the or each steering input located on one side of the gearbox housing.

In a still further aspect, the presently disclosed subject matter provides a gear change unit including: an input shaft including a drive input; an output shaft including a drive output; a first gear located around and supported for rotation on the output shaft or the input shaft; a second gear located around and supported for rotation on the same output shaft or input shaft as the first gear; a third gear located around and supported for rotation on the other of the input or output shafts not supporting the first and second gears; and a slideable dog hub operably connectable to a gear change selector, wherein the slideable dog hub is located on the same output shaft or input shaft as the first and second gears in slideable engagement and constrained for rotation therewith, wherein the slideable dog hub is located between the first and second gears, wherein the gear change unit is configured so that, in use, when the slideable dog hub is engaged with the first gear, drive is transmitted from the drive input to the drive output via a first gear chain not including the second or third gears, and when the slideable dog hub is engaged with the second gear, drive is transmitted from the drive input to the drive output via a second gear chain including the first, second and third gears. In this way, two gear ratios may be provided from the drive input to the drive output in a compact arrangement.

Optionally the first gear and the third gear include compound gears which mesh with one another.

A conventional lay-shaft gearbox has a set of gears on a drive shaft that mesh with gears on a lay-shaft in pairs of gears. However, the overall ratio can be limited due to limitation in gear sizes between smallest gear possible and the largest gear possible. An arrangement of gearing with compound gears on the drive shaft and output shaft provides a compact way of achieving a large gear ratio spread between the highest and the lowest gears without having to use a very large gear and a very small gear to obtain the desired ratio.

The first and second gears may optionally be located on the output shaft and wherein the drive input includes a drive input gear fixed to the input shaft which meshes with the first gear.

The gear change unit may optionally include: a fourth gear located around and supported for rotation on the same output shaft or input shaft as the third gear; and a second slideable dog hub operably connectable to a gear change selector, wherein the second slideable dog hub is located on the same output shaft or input shaft as the third and fourth gears in slideable engagement and constrained for rotation therewith, wherein the second slideable dog hub is located between the third and fourth gears, wherein the gear change unit is configured so that, in use, when the second slideable dog hub is engaged with the fourth gear the first and second gear chains may be selected by the slideable dog hub, and wherein when the second slideable dog hub is engaged with the third gear and the slideable dog hub is engaged with the first gear, drive is transmitted from the drive input to the drive output via a third gear chain not including the second or fourth gears, and when the second slideable dog hub is engaged with the third gear and the slideable dog hub is engaged with the second gear, drive is transmitted from the drive input to the drive output via a fourth gear chain not including the first or fourth gears. In this way, four gear ratios may be provided from the drive input to the drive output in a compact arrangement.

The propulsion input shaft and the output shaft may be parallel to one another and spaced from one another in a direction normal to the major axis of the propulsion input shaft for simplicity of realisation.

In yet another aspect, the presently disclosed subject matter provides a gearbox for a skid steered vehicle, the gearbox including: a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs; a steering input shaft in driveable communication with the controlled differential, wherein one end of the steering input shaft forms a steering input to the gearbox; a propulsion input shaft in driveable communication with the gearbox outputs, wherein one end of the propulsion input shaft forms a propulsion input to the gearbox; and a gear change unit as described just above in driveable communication with the gearbox outputs, wherein the propulsion input shaft and the gear change unit are connected in a parallel connection with an output of the controlled differential to the gearbox outputs.

The gearbox may have the or each steering input and the or each propulsion input located on the same side of the gearbox housing.

In another aspect, the presently disclosed subject matter provides a gear change unit including: an epicyclic gear set having an input component configured to be driven by a drive input, and an output component, wherein the input component and the output component are supported for rotation on a drive shaft; and a slideable dog hub operably connectable to a gear change selector, wherein the slideable dog hub is in slideable engagement with the drive shaft and constrained for rotation therewith, wherein the slideable dog hub is configured to be engageable with the input component of the epicyclic gear set to connect the input component directly to the drive shaft, and wherein the slideable dog hub is configured to be engageable with the output component of the epicyclic gear set so to connect the input component to the drive shaft via the output component.

The epicyclic gear change unit is beneficial because it allows for the size of any gearing offset from the drive shaft to be minimised. The epicyclic gear change unit located on the drive shaft allows lower torque to be input to the input component (via the offset gearing) and the required high torque output onto the drive shaft, via the output component, to be shared between the planet gears of the epicyclic gear change unit.

In a further aspect, the presently disclosed subject matter provides a gearbox for a skid steered vehicle, the gearbox including: a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such the sun gear outputs of the controlled differential attach solidly to and turn at the same speed as the gearbox outputs; a steering input shaft in driveable communication with the controlled differential, wherein one end of the steering input shaft forms a steering input to the gearbox; a propulsion input shaft in driveable communication with the gearbox outputs, wherein one end of the propulsion input shaft forms a propulsion input to the gearbox; and a gear change unit as described just above in driveable communication with the gearbox outputs, wherein the propulsion input shaft and the gear change unit are connected in a parallel connection with an output of the controlled differential to the gearbox outputs.

As before, the gearbox may have the or each steering input and the or each propulsion input located on the same side of the gearbox housing.

In a still further aspect, the presently disclosed subject matter provides a drive unit for a skid steered vehicle, the drive unit including: any gearbox as described above; an electric steering motor operatively connected to the or each steering input; and an electric propulsion motor operatively connected to the or each propulsion input.

In yet another aspect, the presently disclosed subject matter provides a drive unit for a skid steered vehicle, the drive unit including: a gearbox as described just above, wherein the gearbox has two propulsion inputs and two gear change units; an electric steering motor operatively connected to a steering input; and two electric propulsion motors each being operatively connected to a respective propulsion input, wherein the major axes of the electric propulsion motors are co-axial and wherein the electric propulsion motors are arranged in a face to face configuration. The symmetry of this arrangement may be beneficial to manufacturing and cost considerations, and may also be beneficial for packaging option on vehicle.

Optionally the propulsion inputs may be located inboard of the gear change units so that the overall width of the drive unit may be minimised.

The steering input may also optionally be located inboard of the gear change units.

In another aspect, the presently disclosed subject matter provides a drive unit for a skid steered vehicle, the drive unit including: a gearbox as describe just above, wherein the gearbox has two propulsion inputs and two gear change units; an electric steering motor operatively connected to a steering input; and two electric propulsion motors each being operatively connected to a respective propulsion input, wherein the major axes of the electric propulsion motors define a common plane which is spaced from the drive shafts. This arrangement also allows the overall width of the drive unit to be minimised as the propulsion motors may be arranged in parallel with the drive shafts.

Optionally the drive unit may include two electric steering motors, wherein the major axes of the electric steering motors are parallel to one another and spaced from the drive shafts so that the steering motors may also be arranged in parallel with the drive shafts and propulsion motors.

The electric propulsion motors may optionally be adjacent to one another. With the motors arranged adjacent to one another, with their rotational axes offset and parallel to one another, the overall transmission width can be minimised.

Optionally the or each electric steering motor is identical to the or each electric propulsion motor so that economies of scale as a result of using a single motor variant can be realised.

In yet another aspect, the presently disclosed subject matter provides a drive configuration for a skid steered vehicle including: a respective drive member adapted to be located at each side of the vehicle, each drive member engaging with a track or wheel of the vehicle and operable to drive the tracks or wheels of the vehicle; and any drive unit described above, wherein each drive member is in driveable communication with an output of the gearbox.

The presently disclosed subject matter also provides a vehicle including any one of the drive configurations described above.

BRIEF DESCRIPTION OF THE FIGURES

The presently disclosed subject matter will now be described by way of non-limiting examples with reference to the following figures, in which:

FIG. 9b shows a magnified view of a gear assembly of the drive unit shown in FIG. 9a;

FIG. 10b shows a magnified view of a gear assembly of the drive unit shown in FIG. 10a;

FIG. 11b shows a magnified view of a gear assembly of the drive unit shown in FIG. 11a;

FIG. 12b shows a schematic side outline view of the drive units of the embodiments shown in FIGS. 9a, 10a, 11a and 12a;

FIG. 13b shows a schematic side outline view of the drive unit of the embodiment shown in FIG. 13a;

FIG. 18a shows a schematic isometric view of a drive unit in accordance with either of the embodiments of FIG. 16a or 17a;

FIG. 18b shows a schematic representation of a partial cutaway end view of a gearbox in accordance with the embodiment of FIG. 18a;

FIG. 18c shows a schematic isometric view of an alternative drive unit in accordance with either of the embodiments of FIG. 16a or 17a.

DETAILED DESCRIPTION

Figure 1:
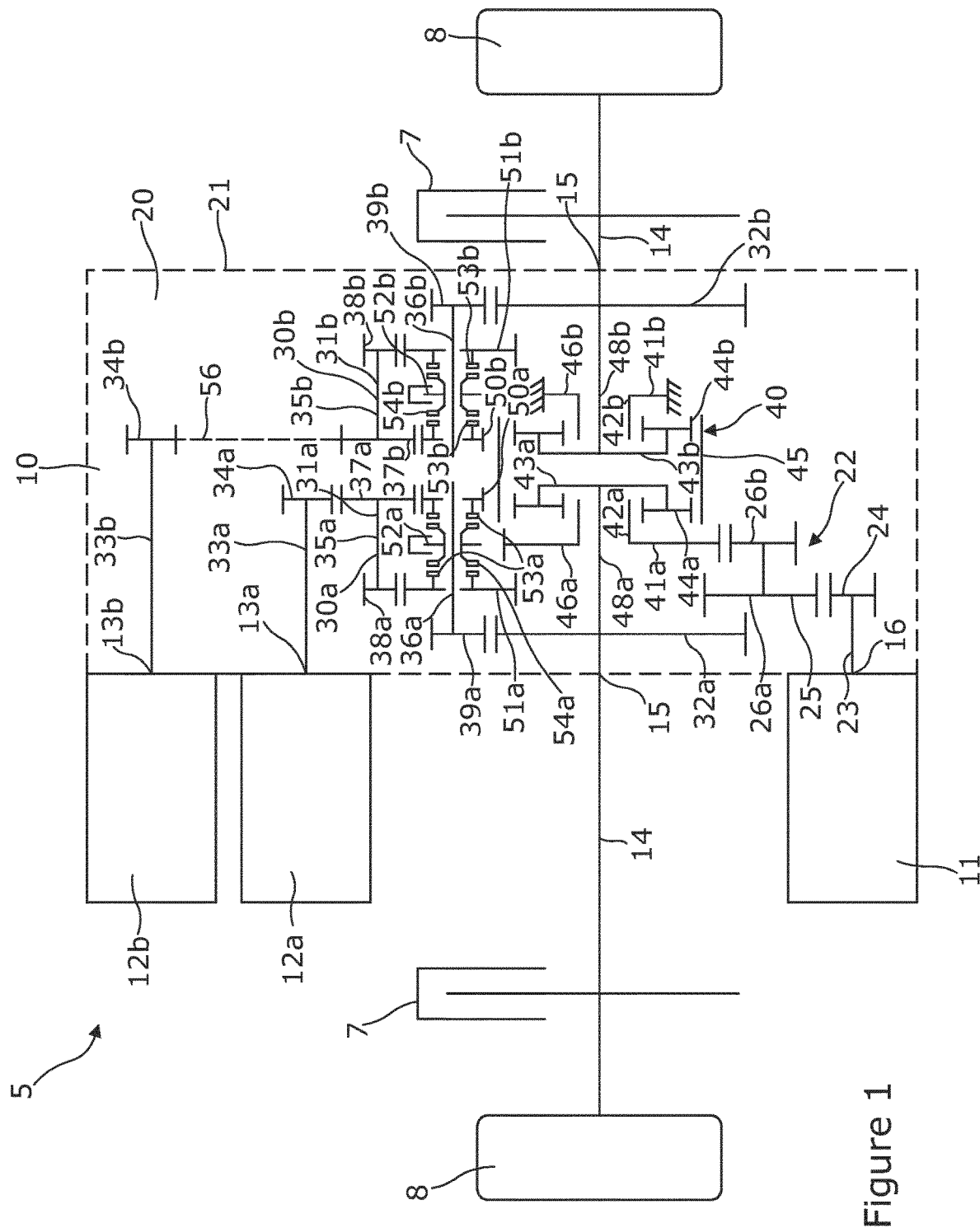
FIG. 1 shows a schematic representation of a drive configuration for a skid steered vehicle in accordance with an embodiment of the disclosed subject matter.

FIG. 1 shows a schematic representation of the components and component connections of a drive configuration 5 suitable for use in a skid steered vehicle. The drive configuration 5 includes a drive unit 10 located between two drive members 8 located respectively at each side of the vehicle (not shown). The drive members 8 are connected to gearbox outputs 15 (described below) of the drive unit 10 by drive shafts 14. Brakes 7 are fitted to the drive shafts 14 inboard of the drive members 8 and outboard of the gearbox outputs 15.

The drive unit 10 includes a gearbox 20 which has a steering input 16 and two propulsion inputs 13a, 13b located on one side of a housing 21 of the gearbox 20. An electric steering motor 11 is connected to the gearbox 20 at steering input 16, and two electric propulsion motors 12a, 12b are connected to the gearbox 20 at propulsion inputs 13a, 13b. The propulsion motors 12a, 12b may be identical to one another, and the steering motor 11 may be identical to the propulsion motors 12a, 12b. Alternatively, the propulsion motors 12a, 12b may be different from one another, and the steering motor 11 may be the same as one of the propulsion motors 12a, 12b, or different to both of the propulsion motors 12a, 12b.

The steering input 16 and the propulsion inputs 13a, 13b are located on the same side of the gearbox 20 such that the steering motor 11 and the propulsion motors 12a, 12b are located on the same side of the gearbox 20.

The gearbox 20 includes a controlled differential 40 located between and connecting the two drive shafts 14. Outputs 48a, 48b of the controlled differential 40 are in driveable communication with each drive shaft 14 as will be described in greater detail below.

The controlled differential 40 includes two epicyclic gear sets 41a, 41b. Each epicyclic gear set 41a, 41b, includes a sun gear 42a, 42b, a carrier 43a, 43b forming the outputs 48a, 48b of the controlled differential 40, planet gears 44a, 44b, and a common ring gear 45.

The gearbox 20 includes a steering gear arrangement 22 which includes a steering input shaft 23 to which is fixed a steering input gear 24, and a compound gear 25. The steering input gear 24 meshes with one side 26a of the compound gear 25, and the other side 26b of the compound gear 25 meshes with an intermediate steering gear 46a which is rigidly fixed to the sun gear 42a of the epicyclic gear set 41a of the controlled differential 40. The sun gear 42b of the epicyclic gear set 41b of the controlled differential 40 is fixed against rotation by connection to the housing 21 of the gearbox 20 via intermediate wheel 46b.

The gearbox 20 further includes first and second propulsion gear arrangements 30a, 30b which are configured to direct propulsion drive from the propulsion motors 12a, 12b to the drive shaft 14 as will be described below.

The first propulsion gear arrangement 30a includes a first propulsion input shaft 33a, the outboard end of which forms propulsion input 13a of the gearbox 20. A first propulsion input gear 34a is fixed to the inboard end of the first propulsion input shaft 33a. The first propulsion gear arrangement 30a further includes first gear change unit 31a and first primary drive gear 32a which is fixed to the drive shaft 14 to allow power from the propulsion motor 12a to be transmitted to the drive shaft 14 via the first propulsion input shaft 33a and the first gear change unit 31a.

The first gear change unit 31a includes a first gear input shaft 35a and a first gear output shaft 36a. The first gear input shaft 35a has first and second gears 37a, 38a fixed thereto, and the first gear output shaft 36a has a third gear 39a fixed thereto. The first gear 37a of the first gear input shaft 35a meshes with the first propulsion input gear 34a, and the third gear 39a of the first gear output shaft 36a meshes with the first primary drive gear 32a.

The first gear output shaft 36a carries fourth and fifth gears 50a, 51a, wherein the fourth and fifth gears 50a, 51a are supported for rotation on the first gear output shaft 36a. The fourth gear 50a meshes with the first gear 37a, and the fifth gear 51a meshes with the second gear 38a.

The first gear output shaft 36a also carries a slideable dog hub 52a which is connected to a gear shift mechanism (not shown). The slideable dog hub 52a is attached to the first gear output shaft 36a via a spline connection (not shown) such that the slideable dog hub 52a can slide with respect to the first gear output shaft 36a, but is fixed for rotation therewith.

The fourth and fifth gears 50a, 51a each include dogs 53a which are engageable with dogs 54a of the slideable dog hub 52a. In use, when the slideable dog hub 52a is engaged with the fourth gear 50a, power is transmitted to the third gear 39a from the propulsion motor 12a via the first propulsion input gear 34a and the first and fourth gears 37a, 50a. Power is then transmitted from the third gear 39a to the drive shaft 14 via the first primary drive gear 32a.

Conversely, when the slideable dog hub 52a is engaged with the fifth gear 51a, power is transmitted to the third gear 39a from the propulsion motor 12a via the first propulsion input gear 34a and the second and fifth gears 38a, 51a. Power is then transmitted from the third gear 39a to the drive shaft 14 via the first primary drive gear 32a.

The second propulsion gear arrangement 30b includes a second propulsion input shaft 33b, the outboard end of which forms propulsion input 13b of the gearbox 20. A second propulsion input gear 34b is fixed to the inboard end of the second propulsion input shaft 33b. The second propulsion gear arrangement 30b further includes second gear change unit 31b and second primary drive gear 32b which is fixed to the drive shaft 14 to allow power from the propulsion motor 12b to be transmitted to the drive shaft 14 via the second propulsion input shaft 33b and the second gear change unit 31b.

The second gear change unit 31b includes a second gear input shaft 35b and a second gear output shaft 36b. The second gear input shaft 35b has first and second gears 37b, 38b fixed thereto, and the second gear output shaft 36b has a third gear 39b fixed thereto. The first gear 37b of the second gear input shaft 35b meshes with the second propulsion input gear 34b. This is schematically illustrated in FIG. 1 by dotted line 56 which indicates that the first gear 37b of the second gear input shaft 35b meshes with the second propulsion input gear 34b. The physical manifestation of this can be seen most readily in FIG. 2 (described below). The third gear 39b of the second gear output shaft 36b meshes with the second primary drive gear 32b.

The second gear output shaft 36b carries fourth and fifth gears 50b, 51b, wherein the fourth and fifth gears 50b, 51b are supported for rotation on the second gear output shaft 36b. The fourth gear 50b meshes with the first gear 37b, and the fifth gear 51b meshes with the second gear 38b.

The second gear output shaft 36b also carries a slideable dog hub 52b which is connected to a gear shift mechanism (not shown). The slideable dog hub 52b is attached to the second gear output shaft 36b via a spline connection (not shown) such that the slideable dog hub 52b can slide with respect to the second gear output shaft 36b, but is fixed for rotation therewith.

The fourth and fifth gears 50b, 51b of the second gear change unit 31b each include dogs 53b which are engageable with dogs 54b of the slideable dog hub 52b. In use, when the slideable dog hub 52b is engaged with the fourth gear 50b, power is transmitted to the third gear 39b from the propulsion motor 12b via the second propulsion input gear 34b and the first and fourth gears 37b, 50b of the second gear change unit 31b. Power is then transmitted from the third gear 39b to the drive shaft 14 via the second primary drive gear 32b.

Conversely, when the slideable dog hub 52b is engaged with the fifth gear 51b of the second gear change unit 31b, power is transmitted to the third gear 39b from the propulsion motor 12b via the second propulsion input gear 34b and the second and fifth gears 38b, 51b of the second gear change unit 31b. Power is then transmitted from the third gear 39b to the drive shaft 14 via the second primary drive gear 32b.

As can be seen from FIG. 1, the drive shafts 14 receive drive input from the propulsion motors 12a, 12b—via the primary drive gears 32a, 32b—in a parallel connection with the outputs 48a, 48b of the controlled differential 40 such that, in use, the speed of the gearbox outputs 15 are determined by the propulsion inputs from the propulsion motors 12a, 12b—via the propulsion gear arrangements 30a, 30b respectively—and the outputs 48a, 48b of the controlled differential 40.

For straight line driving, the steer motor 11 is stationary such that the sun gear 42a of the epicyclic gear set 41a of the controlled differential 40 is held stationary. In this condition there will be no relative difference between the speed of the shafts 14 and the electric drive motors 12a, 12b drive the skid steered vehicle in a straight line.

During turning, the steer motor 11 imparts drive to the sun gear 42a of the epicyclic gear set 41a of the controlled differential 40 to cause the sun gear 42a to rotate, thus causing a relative speed difference between the shafts 14. As is known in the art, during turning, the tracks or wheels on one side of a skid steered vehicle travel faster than the tracks or wheels on the other side of the skid steered vehicle. In this condition, the steer motor torque imparts an equal and opposite torque between the outputs 48a, 48b of the controlled differential 40. This allows torque from the slower (or inner) track to be transferred across the controlled differential 40 to the faster (or outer) track and hence power is transferred mechanically from the slower track to the faster track through the controlled differential 40. The power used during skid steering can be three to four times the power used for propulsion. Transferring the steering power mechanically, rather than electrically, from the regenerating slower track to the faster track allows considerably smaller electric propulsion motors 70 to be used than would otherwise be the case. The electric propulsion motors 70 therefore can only have to be sized for propulsion (and not for steering), and the controlled differential 40 and steer motors 60 can only be sized for steering.

Although the drive unit illustrated in FIG. 1 only includes one steering motor 11, it will be understood that a second steering motor could be used together with the steering motor 11. In this case, the sun gear 42b of the epicyclic gear set 41b of the controlled differential 40 would be driven by the second steering motor via a second steering gear arrangement. The second steering motor could either be configured to run in the opposite sense to the steering motor 11 to ensure the opposite turning of the sun gears 42a, 42b, or an additional gear could be used in the second steering gear arrangement to reverse the input direction from the second motor. The second steering motor could be located opposite the steering motor 11, on the other side of the gearbox 20, or it could be located on the same side as the steering motor 11 and connected to the second steering gear arrangement by an elongate steering input shaft able to reach past the steering gear arrangement 22 and the controlled differential 40. Alternatively, a second steering motor could connect to intermediate steering gear 46a via a second steering gear arrangement 22 to duplicate the steering input to the intermediate steering gear 46a and hence the input to the sun gear 42a.

In an alternative embodiment (not shown), the propulsion gear arrangements 30a, 30b do not include gear change units 31a, 31b, but rather include fixed ratio gears which transmit drive torque from the electric propulsion motors 12a, 12b to the drive shafts 14 across a single gear ratio reduction. In this case the propulsion gear arrangements 30a, 30b are gear reduction units and not gear change units.

FIGS. 2 to 6 show a three dimensional model of a drive configuration 5 in accordance with the embodiment of FIG. 1 described above. For clarity, like reference numerals are used to reference like components.

Figure 2:
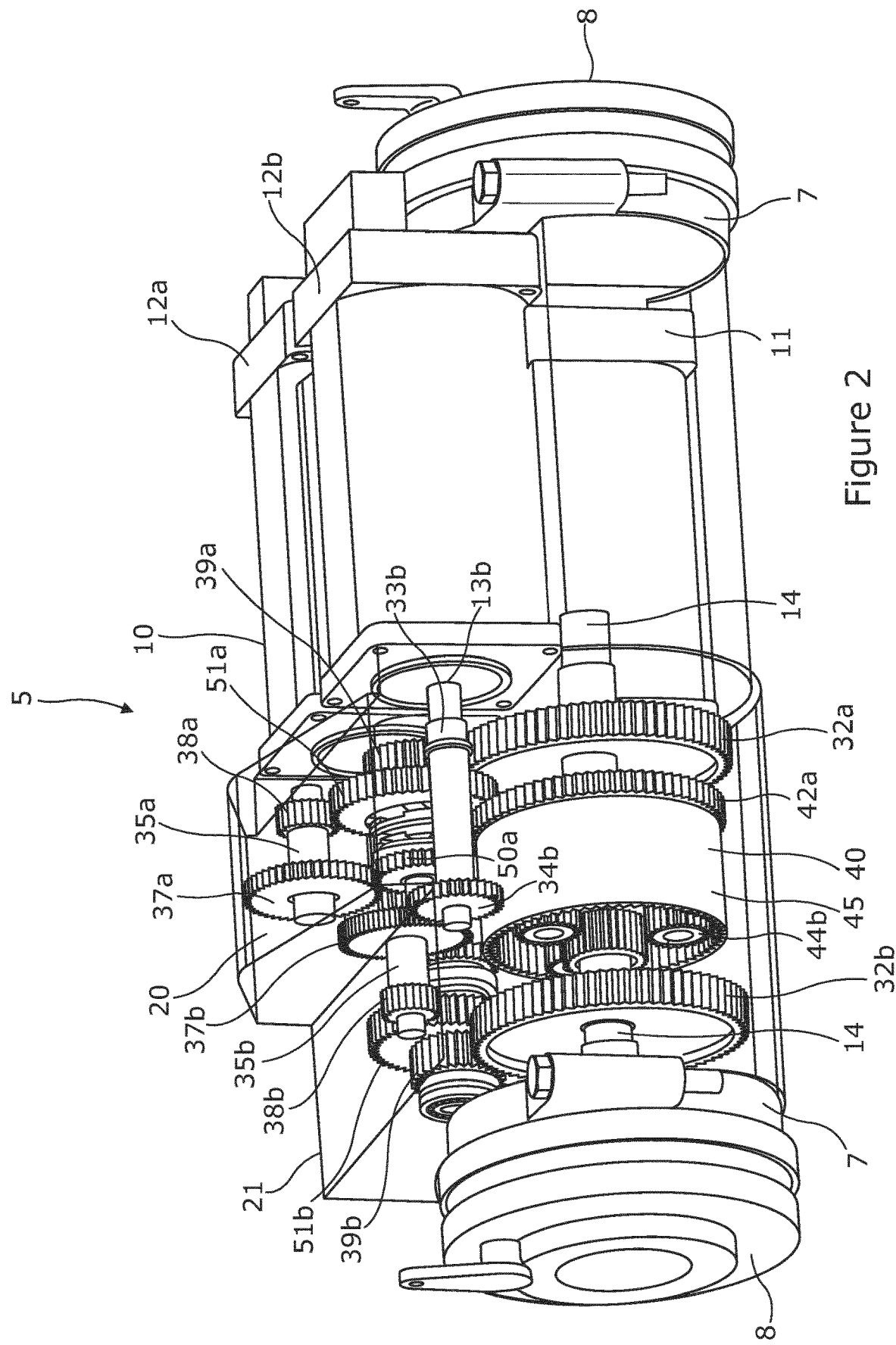
FIG. 2 shows a drive configuration for a skid steered vehicle in accordance with the embodiment of FIG. 1.
Figure 4:
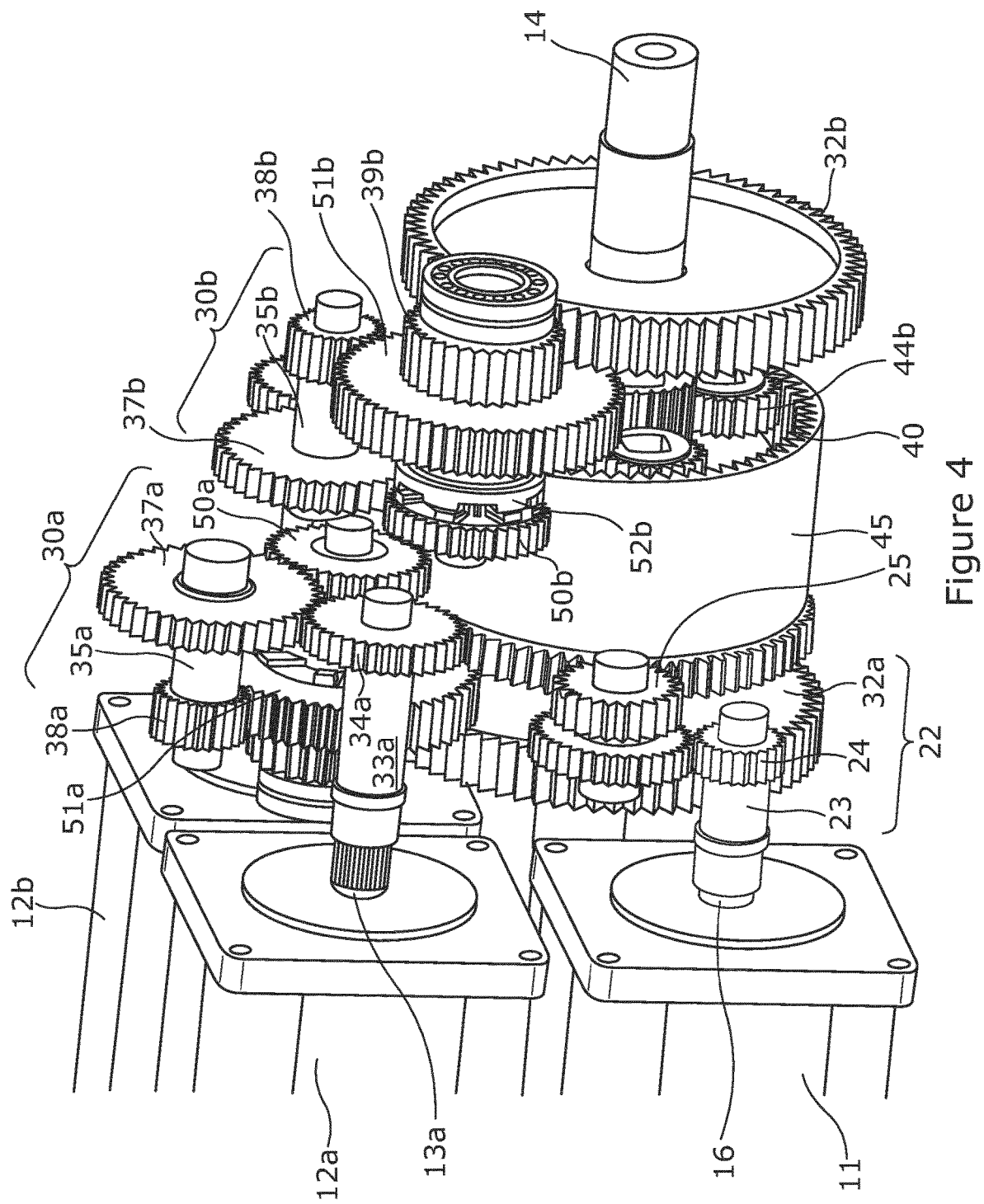
FIG. 4 shows an alternative view of the detail shown in FIG. 3.
Figure 5:
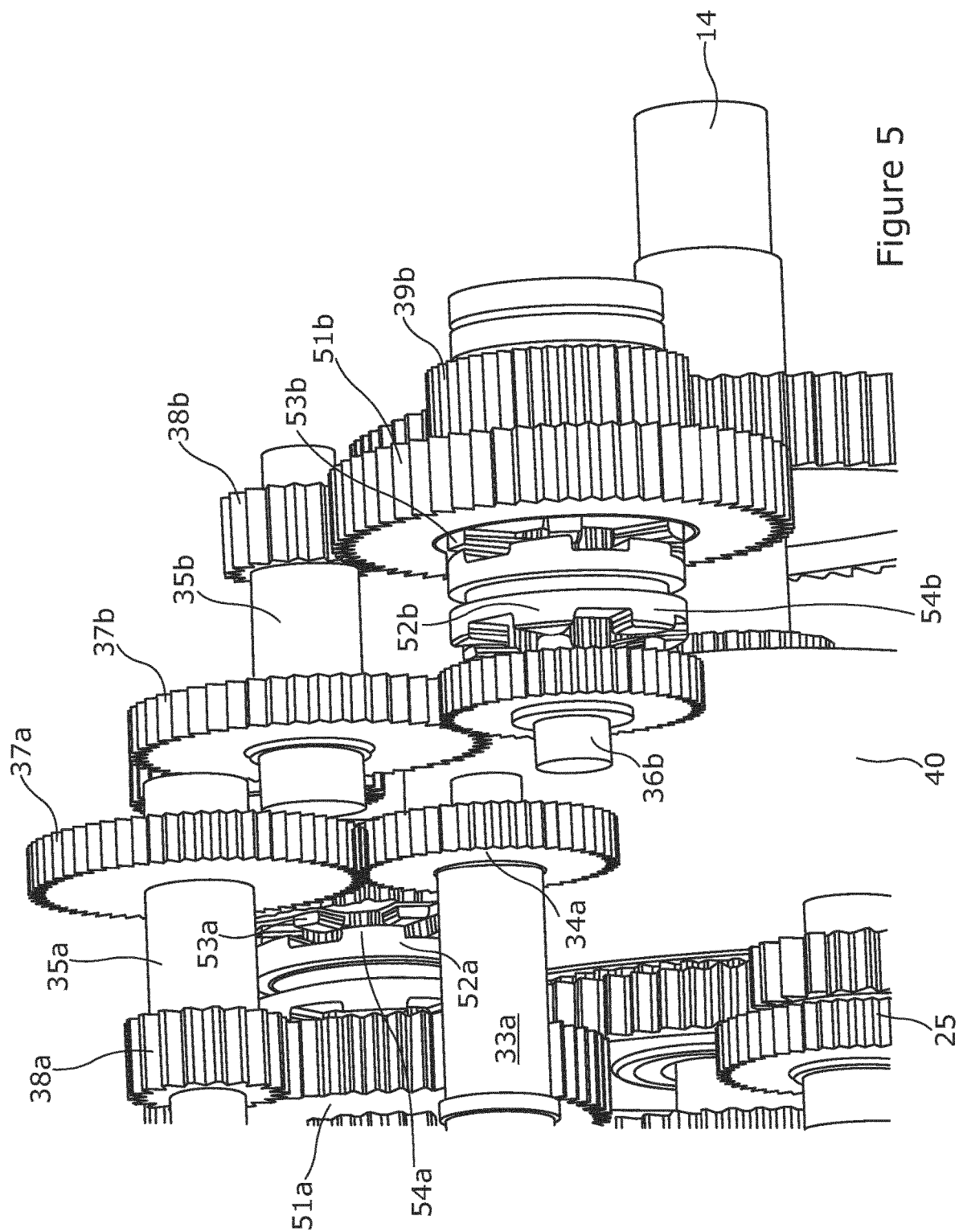
FIG. 5 shows a magnified further alternative view of the detail of FIG. 3.

As can be seen most clearly in FIG. 2, the housing 21 of the gearbox 20 contains the controlled differential 40, the steering gear arrangement (22 in FIG. 4) and the two propulsion gearing arrangements (30a, 30b in FIG. 4). The steering motor 11 and the two propulsion motors 12a, 12b are each located on the same side of the housing 21 of the gearbox 20. In this embodiment, the steering motor and the two propulsion motors 12a, 12b are identical.

Figure 3:
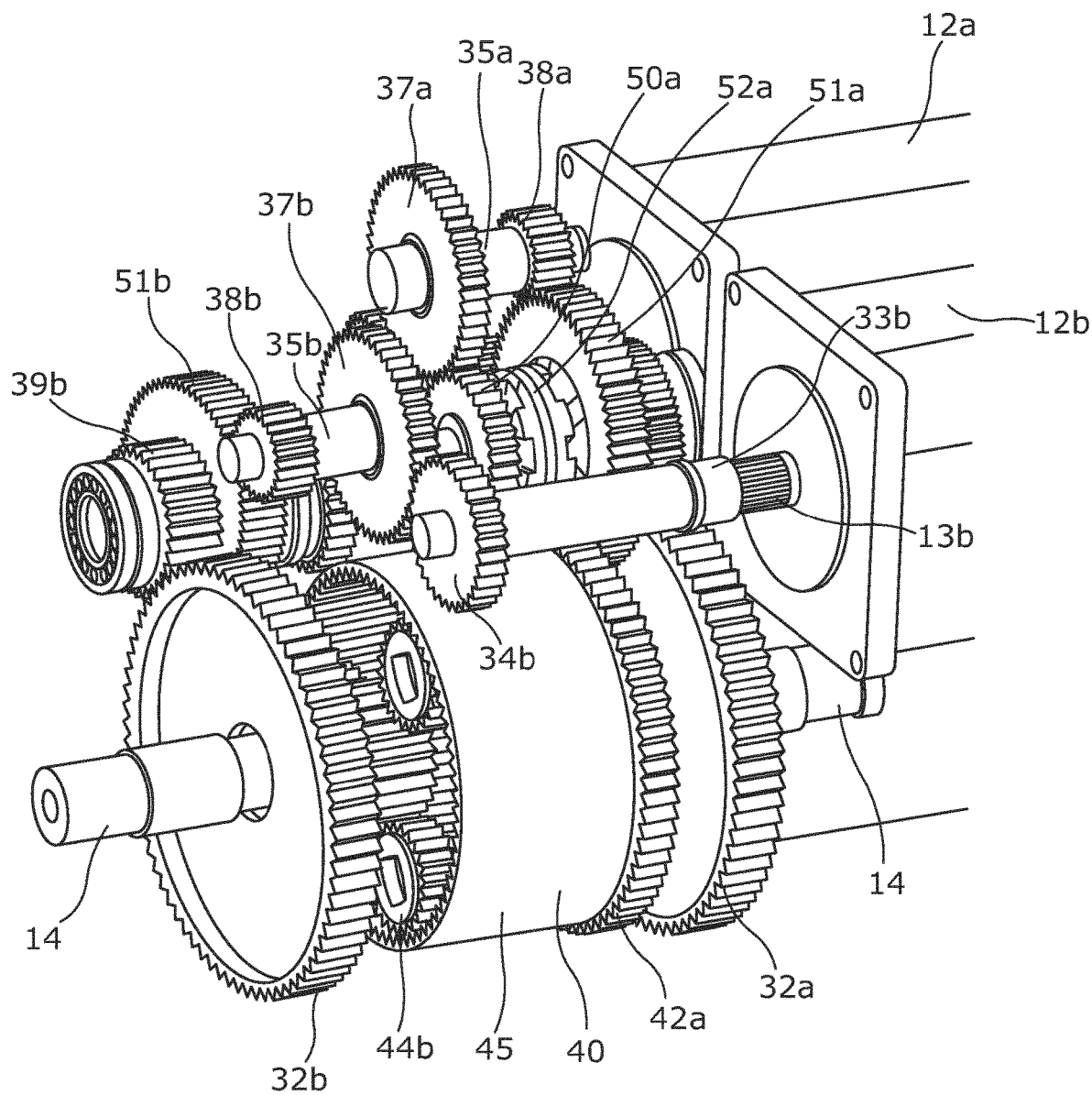
FIG. 3 shows a detail of part of the drive configuration shown in the embodiment of FIG. 2.
Figure 6:
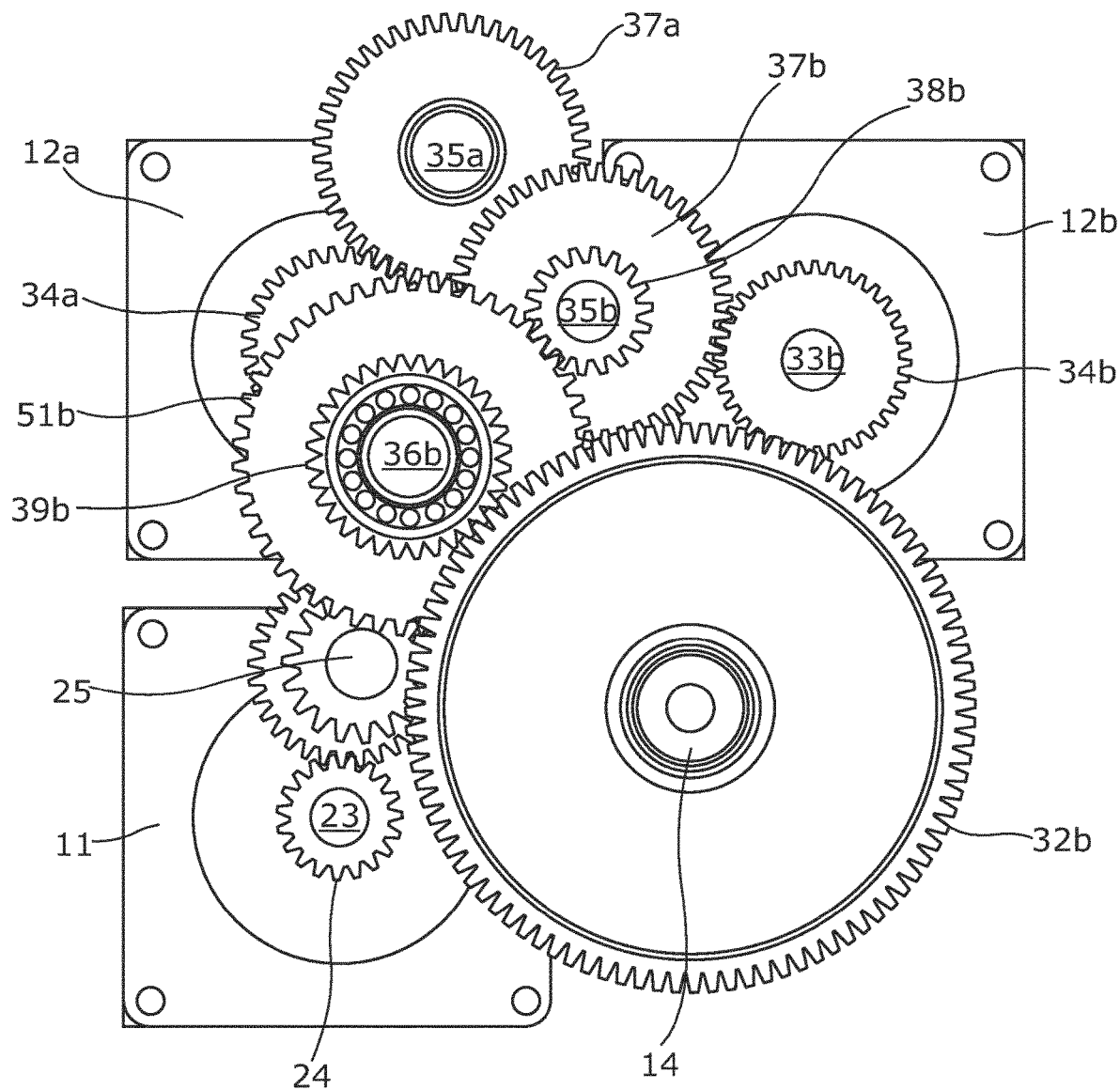
FIG. 6 shows an end view of detail shown in FIG. 3.

As illustrated by FIGS. 3 and 6, the outermost circumference of the fifth gears 51a, 51b of the first and second gear change units 31a, 31b overlap the outermost circumference of the first and second primary drive gears 32a, 32b. This arrangement is particularly advantageous for a compact package.

Figure 7:
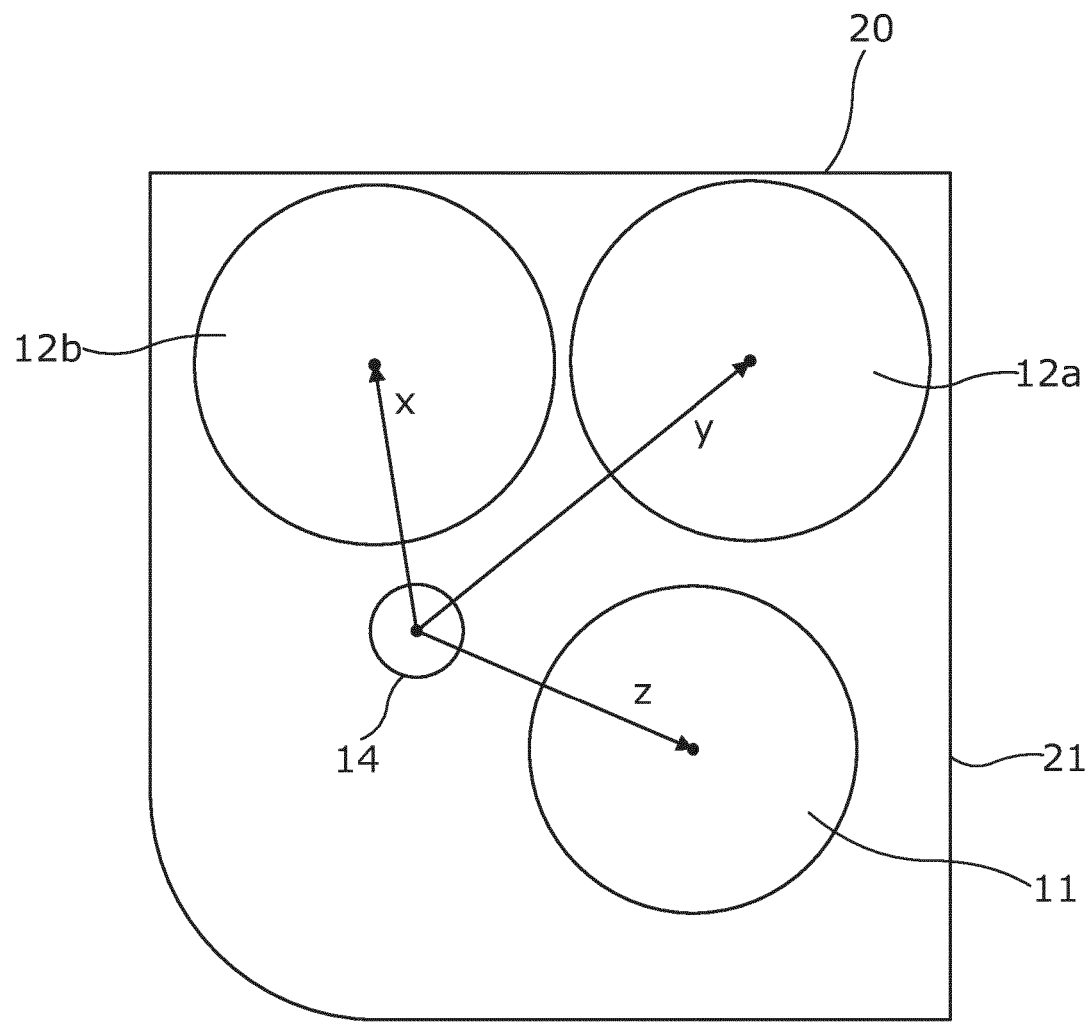
FIG. 7 shows a schematic representation of an end view of a gearbox in accordance with an embodiment of the disclosed subject matter.

FIG. 7 shows a schematic end view of the gearbox 20 looking towards the gearbox housing 21 from the outboard ends on the steering motor 11 and propulsion motors 12a, 12b. In this view it can be seen that the linear distances X, Y, Z between the centre lines of the motors 11, 12a, 12b are substantially equal such that the dimensions of the housing 21 of the gearbox 20 are minimised. The linear distances X, Y, Z may for example be about 150 mm, with substantially equal distances being plus or minus 5% of 150 mm. However, this is an example and other linear distances may be employed depending on the exact configuration of the gearbox. Linear distances which are within plus or minus 5% of each other are considered to be substantially equal.

Figure 8:
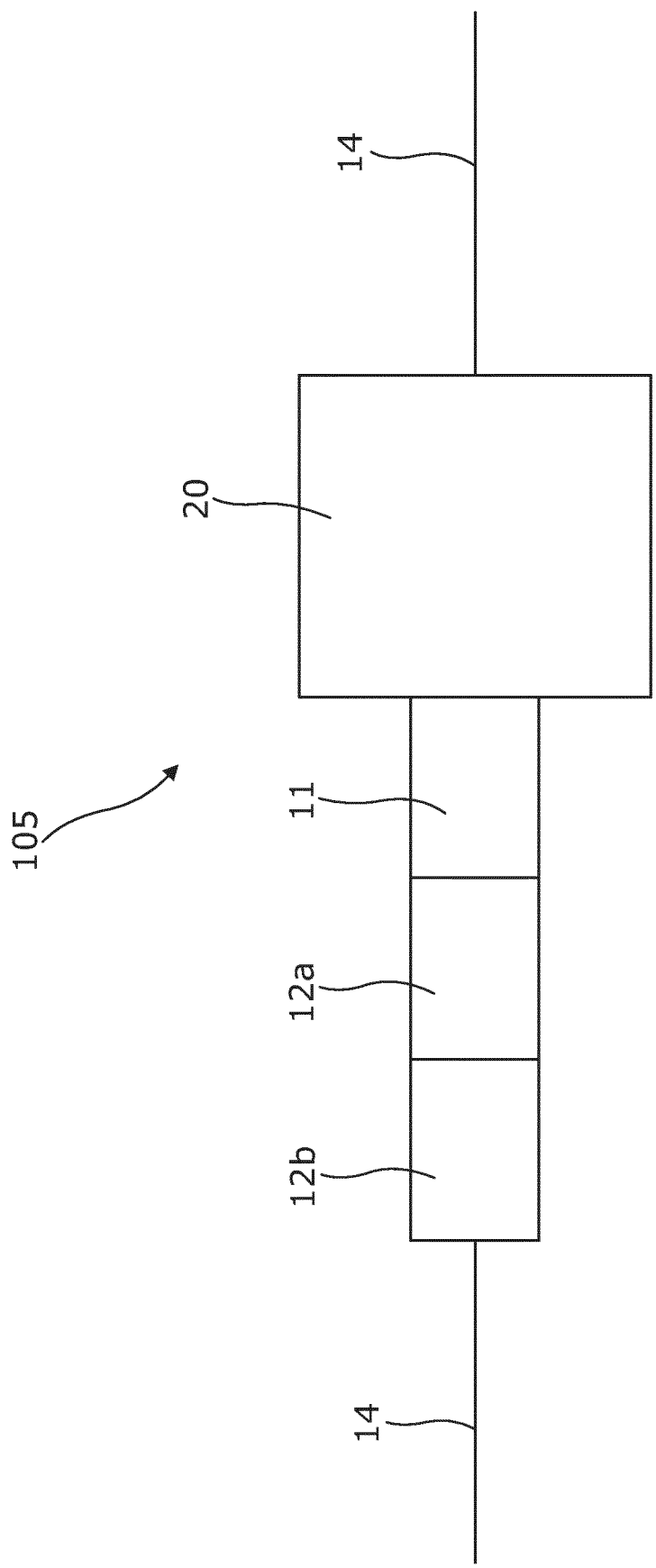
FIG. 8 shows a schematic representation of an alternative drive unit for a skid steered vehicle in accordance with an embodiment of the disclosed subject matter.

FIG. 8 shows a schematic representation of an alternative drive unit 105 for a skid steered vehicle. For clarity, like reference numerals to those used above are used for like components. In this example, the steering motor 11, the propulsion motors 12a, 12b and the gearbox outputs 15 (and hence drive shafts 14) are co-axial and located on one side of the gearbox 20. The co-axial arrangement is achieved by nested concentric propulsion input shafts 33a, 33b, steering input shaft 23, and drive shafts 14.

Figure 9A:
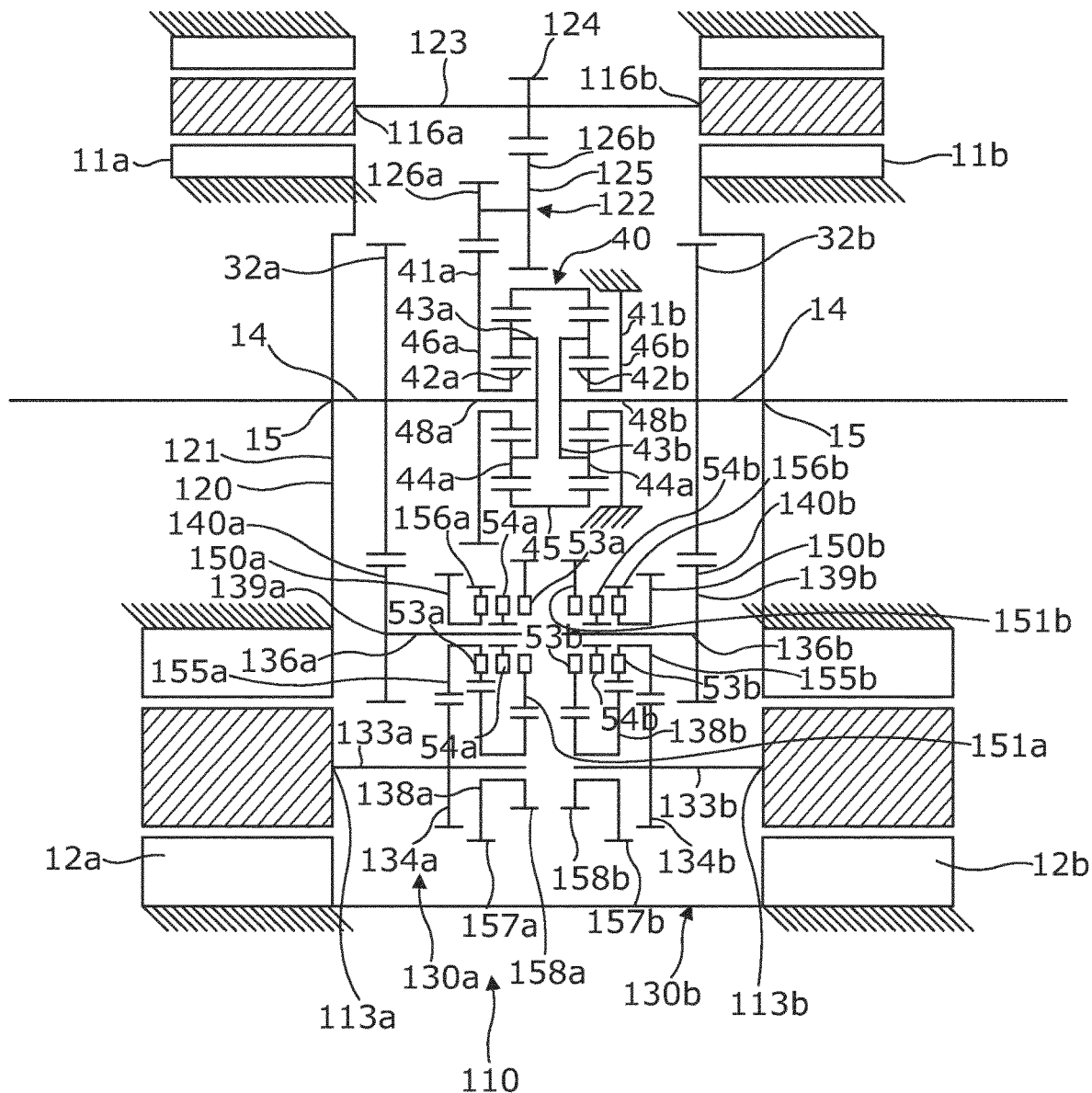
FIG. 9a shows a schematic representation of a drive unit for a skid steered vehicle in accordance with another embodiment of the disclosed subject matter.
Figure 9B:
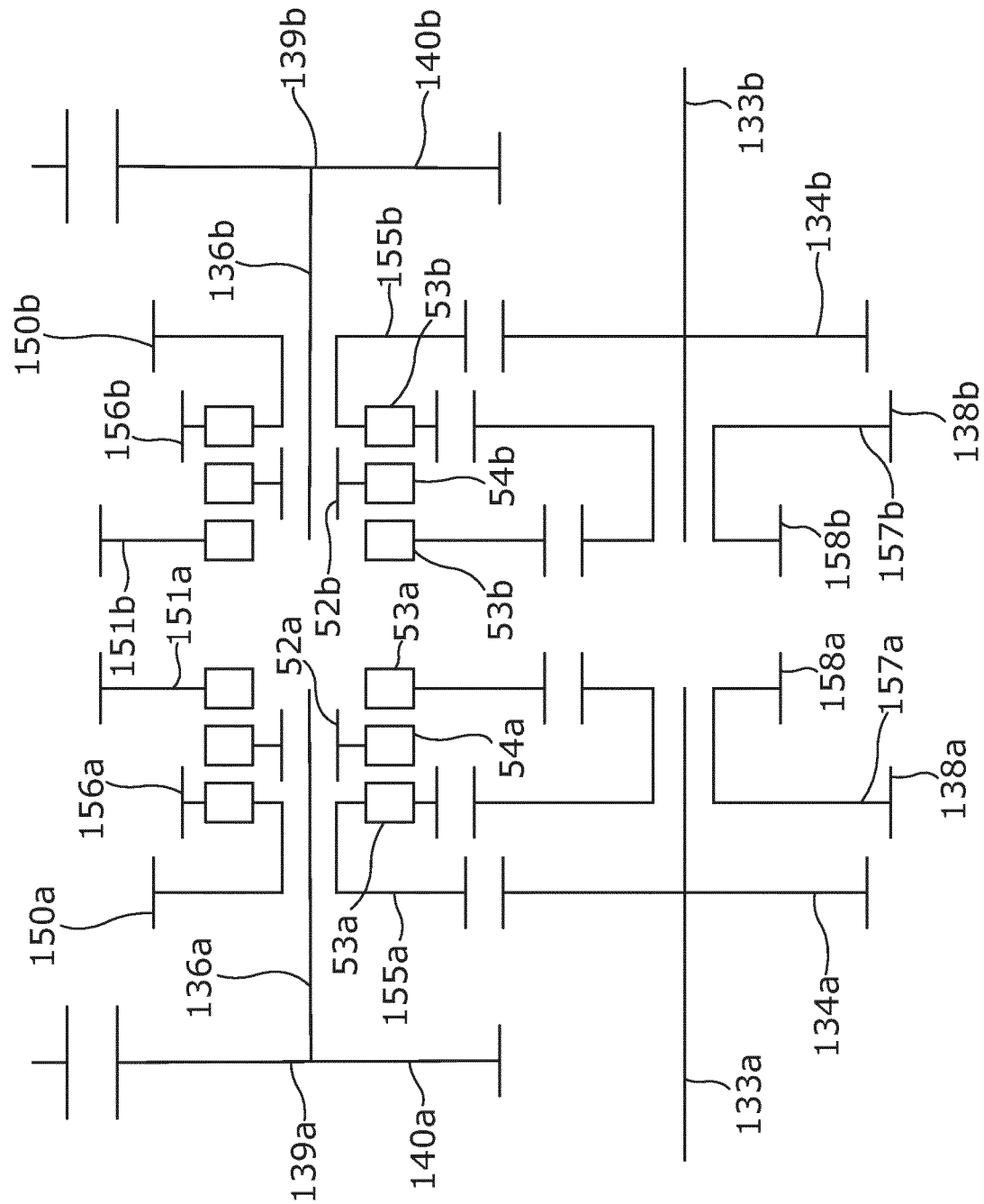

FIG. 9a shows a schematic representation of the components and component connections of another embodiment of a drive unit 110 suitable for use in a skid steered vehicle. For clarity, like reference numerals to those used above are used for like components. FIG. 9b shows a magnified view of a gear assembly of the drive unit shown in FIG. 9a.

In this embodiment, the drive unit 110 includes a gearbox 120 which has first and second steering inputs 116a, 116b and first and second propulsion inputs 113a, 113b located on the sides of a housing 121 of the gearbox 120 such that one side of the housing 121 includes the first steering input 116a and the first propulsion input 113a, and the opposing side of the housing 121 includes the second steering input 116b and the second propulsion input 113b. First and second electric steering motors 11a, 11b are connected to the gearbox 120 at the respective first and second steering inputs 116a, 116b, and first and second electric propulsion motors 12a, 12b are connected to the gearbox 120 at the respective first and second propulsion inputs 113a, 113b.

The gearbox 120 includes a controlled differential 40 located between and connecting two drive shafts 14. Outputs 48a, 48b of the controlled differential 40 are in driveable communication with each drive shaft 14.

The controlled differential 40 includes two epicyclic gear sets 41a, 41b. Each epicyclic gear set 41a, 41b, includes a sun gear 42a, 42b, a carrier 43a, 43b forming the outputs 48a, 48b of the controlled differential 40, planet gears 44a, 44b, and a common ring gear 45.

The gearbox 120 further includes a steering gear arrangement 122 which includes a steering input gear 124 fixed to a steering input shaft 123, and a compound gear 125 including first and second gear wheels 126a, 126b. The steering input shaft 123 is located between, and connected to, the drive outputs of the steering motors 11a, 11b. The steering input gear 124 meshes with the first gear wheel 126a of the compound gear 125, and the second gear wheel 126b of the compound gear 125 meshes with an intermediate steering gear 46a which is rigidly fixed to the sun gear 42a of the epicyclic gear set 41a of the controlled differential 40. The sun gear 42b of the epicyclic gear set 41b of the controlled differential 40 is fixed against rotation by connection to the housing 121 of the gearbox 120 via an intermediate wheel 46b.

The gearbox 120 also includes first and second gear change units 130a, 130b which are configured to direct propulsion drive from the propulsion motors 12a, 12b to the drive shaft 14 as described below.

The first gear change unit 130a includes a first input shaft 133a, the outboard end of which forms the first propulsion input 113a of the gearbox 120. The first input shaft 133a provides drive input from the first propulsion motor 12a to the first gear change unit 130a. In this example embodiment, the first input shaft 133a provides drive input to the first gear change unit 130a via a first drive input gear 134a which is fixed to the first input shaft 133a.

The first gear change unit 130a further includes a first output shaft 136a, the outboard end of which forms a first drive output 139a of the first gear change unit 130a. In this example embodiment, the first drive output 139a includes a gear 140a which is fixed to the first output shaft 136a.

The first output shaft 136a carries first and second gears 150a, 151a each supported for rotation on the first output shaft 136a, and the first input shaft 133a carries a third gear 138a supported for rotation on the first input shaft 133a. The first gear 150a is a compound gear including two gear wheels 155a, 156a, and the third gear 138a is a compound gear including two gear wheels 157a, 158a.

Gear wheel 155a of the first gear 150a carried by the first output shaft 136a meshes with the first drive input gear 134a, and gear wheel 156a of the first gear 150a meshes with gear wheel 157a of the third gear 138a carried by the first input shaft 133a. Gear wheel 158a of the third gear 138a meshes with the second gear 151a carried by the first output shaft 136a.

The first output shaft 136a also carries a first slideable dog hub 52a which is connected to a gear shift mechanism (not shown). The first slideable dog hub 52a is attached to the first output shaft 136a via a spline connection (not shown) such that the first slideable dog hub 52a can slide with respect to the first output shaft 136a, but is fixed for rotation therewith.

First and second gears 150a, 151a each include dogs 53a which are engageable with dogs 54a of the first slideable dog hub 52a. In use, when the first slideable dog hub 52a is engaged with the first gear 150a, power is transmitted to the first drive output 139a from the first propulsion motor 12a via the first drive input gear 134a and the first gear 150a. Power is then transmitted from the first drive output 139a to the drive shaft 14 via a first primary drive gear 32a which meshes with the first drive output 139a (including gear 140a). In this configuration, the second and third gears 151a, 138a turn in use, but transmit no power.

Conversely, when the first slideable dog hub 52a is engaged with the second gear 151a, power is transmitted to the first drive output 139a from the first propulsion motor 12a via the first drive input gear 134a, the first gear 150a, the third gear 138a and the second gear 151a. Power is then transmitted from the first drive output 139a to the drive shaft 14 via the first primary drive gear 32a.

The second gear change unit 130b includes a second input shaft 133b, the outboard end of which forms the second propulsion input 113b of the gearbox 120. The second input shaft 133b provides drive input from the second propulsion motor 12b to the second gear change unit 130b. In this example embodiment, the second input shaft 133b provides drive input to the second gear change unit 130b via a second drive input gear 134b which is fixed to the second input shaft 133b.

The second gear change unit 130b further includes a second output shaft 136b, the outboard end of which forms a second drive output 139b of the second gear change unit 130b. In this example embodiment, the second drive output 139b includes a gear 140b which is fixed to the second output shaft 136b.

The second output shaft 136b carries first and second gears 150b, 151b each supported for rotation on the second output shaft 136b, and the second input shaft 133b carries a third gear 138b supported for rotation on the second input shaft 133b. The first gear 150b is a compound gear including two gear wheels 155b, 156b, and the third gear 138b is a compound gear including two gear wheels 157b, 158b.

Gear wheel 155b of the first gear 150b carried by the second output shaft 136b meshes with the second drive input gear 134b, and gear wheel 156b of the first gear 150b meshes with gear wheel 157b of the third gear 138b carried by the second input shaft 133b. Gear wheel 158b of the third gear 138b meshes with the second gear 151b carried by the second output shaft 136b.

The second output shaft 136b also carries a second slideable dog hub 52b which is connected to a gear shift mechanism (not shown). The second slideable dog hub 52b is attached to the second output shaft 136b via a spline connection (not shown) such that the second slideable dog hub 52b can slide with respect to the second output shaft 136b, but is fixed for rotation therewith.

First and second gears 150b, 151b each include dogs 53b which are engageable with dogs 54b of the second slideable dog hub 52b. In use, when the second slideable dog hub 52b is engaged with the first gear 150b, power is transmitted to the second drive output 139b from the propulsion motor 12b via the second drive input gear 134b and the first gear 150b. Power is then transmitted from the second drive output 139b to the drive shaft 14 via a second primary drive gear 32b which meshes with the drive output 139b (including gear 140b). In this configuration, the second and third gears 151b, 138b turn in use, but transmit no power.

Conversely, when the second slideable dog hub 52b is engaged with the second gear 151b, power is transmitted to the second drive output 139b from the propulsion motor 12b via the second drive input gear 134b, the first gear 150b, the third gear 138b and the second gear 151b. Power is then transmitted from the second drive output 139b to the drive shaft 14 via the second primary drive gear 32b.

As can be seen from FIG. 9a, the drive shafts 14 receive drive input from the propulsion motors 12a, 12b—via the primary drive gears 32a, 32b—in a parallel connection with the outputs 48a, 48b of the controlled differential 40 such that, in use, the speed of the gearbox outputs 15 are determined by the propulsion inputs from the propulsion motors 12a, 12b—via the first and second gear change units 130a, 130b respectively—and the outputs 48a, 48b of the controlled differential 40. The steering motors 11a, 11b are then used to control the controlled differential 40 to steer the vehicle, as needed, as described above in relation to FIG. 1.

Figure 10A:
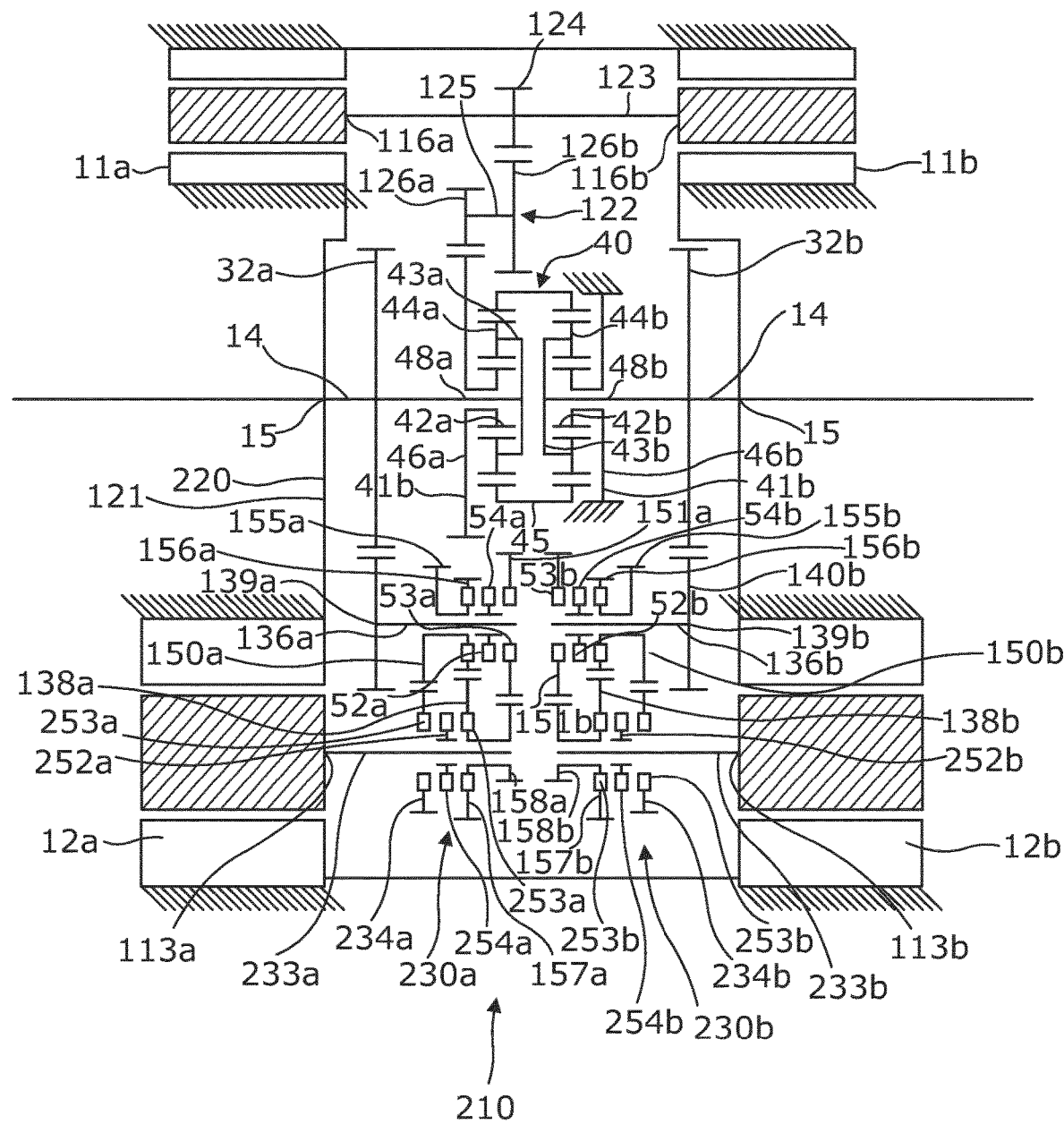
FIG. 10a shows a schematic representation of a drive unit for a skid steered vehicle in accordance with yet another embodiment of the disclosed subject matter.

FIG. 10a shows a schematic representation of the components and component connections of yet another embodiment of a drive unit 210 suitable for use in a skid steered vehicle. For clarity, like reference numerals to those used above are used for like components. FIG. 10b shows a magnified view of a gear assembly of the drive unit shown in FIG. 10a.

The drive unit 210 of the embodiment shown in FIG. 10a includes a gearbox 220 which has first and second steering inputs 116a, 116b and first and second propulsion inputs 113a, 113b located on the sides of a housing 121 of the gearbox 220 such that one side of the housing 121 includes the first steering input 116a and the first propulsion input 113a, and the opposing side of the housing 121 includes the second steering input 116b and the second propulsion input 113b. First and second electric steering motors 11a, 11b are connected to the gearbox 120 at the respective first and second steering inputs 116a, 116b, and first and second electric propulsion motors 12a, 12b are connected to the gearbox 220 at the respective first and second propulsion inputs 113a, 113b.

As can be readily seen from FIG. 10a, the arrangement of the drive shaft 14, the primary drive gears 32a, 32b, the steering gear arrangement 122, and the controlled differential 40 are the same as described above in respect of FIG. 9a. Similarly, the arrangement of the output shafts 136a, 136b—together with the first gears 150a, 150b, the second gears 151a, 151b, and the slideable dog hubs 52a, 52b—of the first and second gear change units 130a, 130b are the same as described above in respect of FIG. 9a.

The first and second gear change units 230a 230b each includes an input shaft 233a, 233b the outboard ends of which respectively form the propulsion inputs 113a, 113b of the gearbox 220. Each input shaft 233a, 233b provides drive input from the propulsion motors 12a, 12b to the first and second gear change units 230a, 230b respectively via slideable dog hubs 252a, 252b as described below.

The input shafts 233a, 233b each carry third 138a, 138b (as in FIG. 9a) and fourth 234a, 234b gears supported for rotation on the input shaft 233a, 233b respectively. As in the embodiment of FIG. 9a, the first gears 150a, 150b are compound gears each including two gear wheels 155a, 156a, 155b, 156b, and the third gears 138a, 138b are compound gears each including two gear wheels 157a, 158a, 157b, 158b.

Gear wheels 155a, 155b of the first gears 150a, 150b mesh with the fourth gears 234a, 234b respectively, and gear wheels 156a, 156b of the first gears 150a, 150b mesh with gear wheels 157a, 157b of the third gears 138a, 138b respectively. Gear wheels 158a, 158b of the third gears 138a, 138b mesh with the second gears 151a, 151b respectively.

As mentioned above, the input shafts 233a, 233b of the first and second gear change units 230a, 230b each carry a slideable dog hub 252a, 252b respectively which are each connected to a gear shift mechanism (not shown). The slideable dog hubs 252a, 252b are attached to the input shafts 233a, 233b respectively via a spline connection (not shown) such that the slideable dog hubs 252a, 252b can slide with respect to the input shafts 233a, 233b but are fixed for rotation therewith.

The third 138a, 138b and fourth 234a, 234b gears of the first and second gear change units 230a, 230b each include dogs 253a, 253b which are engageable with dogs 254a, 254b of the slideable dog hubs 252a, 252b respectively.

In use, when the slideable dog hubs 252a, 252b are engaged with the fourth gears 234a, 234b respectively, power is transmitted to the drive outputs 139a, 139b of the first and second gear change units 230a, 230b from the propulsion motors 12a, 12b via the fourth gears 234a, 234b and the first gears 150a, 150b or the second gears 151a, 151b in the same way as described above for the embodiment of FIG. 9a.

The embodiment of FIG. 10a provides a further two gears for each gear change unit 230a, 230b by slideable dog hubs 252a, 252b. When the slideable dog hubs 252a, 252b of the input shafts 233a, 233b are engaged with the third gears 138a, 138b respectively, and slideable dog hubs 52a, 52b of the output shafts 136a, 136b are engaged with the first gears 150a, 150b respectively, power is transmitted to the drive outputs 139a, 139b from the propulsion motors 12a, 12b via the third gears 138a, 138b and the first gears 150a, 150b. In this configuration, the second 151a, 151b and fourth 234a, 234b gears turn but transmit no power.

Conversely, when the slideable dog hubs 252a, 252b of the input shafts 233a, 233b are engaged with the third gears 138a, 138b respectively, and slideable dog hubs 52a, 52b of the output shafts 136a, 136b are engaged with the second gears 151a, 151b respectively, power is transmitted to the drive outputs 139a, 139b from the propulsion motors 12a, 12b via the third gears 138a, 138b and the second gears 151a, 151b. In this configuration, the first 150a, 150b and fourth 234a, 234b gears turn but transmit no power.

As can be seen from FIG. 10a, the drive shafts 14 receive drive input from the propulsion motors 12a, 12b—via the primary drive gears 32a, 32b—in a parallel connection with the outputs 48a, 48b of the controlled differential 40 such that, in use, the speed of the gearbox outputs 15 are determined by the propulsion inputs from the propulsion motors 12a, 12b—via the first and second gear change units 230a, 230b respectively—and the outputs 48a, 48b of the controlled differential 40. The steering motors 11a, 11b are then used to control the controlled differential 40 to steer the vehicle, as needed, as described above in relation to FIG. 1.

In alternative examples (not shown), the propulsion motors 12a, 12b and the steering motors 11a, 11b of FIGS. 9a and 10 may be located within the housing 121 such that all of the components of the drive unit 110, 210 are packaged within a housing.

In further alternative examples (not shown), each propulsion motor 12a, 12b and each steering motor 11a, 11b may be located on one side of the gearbox housing 121. In such embodiments, the input shaft from one of the propulsion motors reaches across the gearbox, past a first gear change unit and the controlled differential to drive a second gear change unit.

Figure 11A:
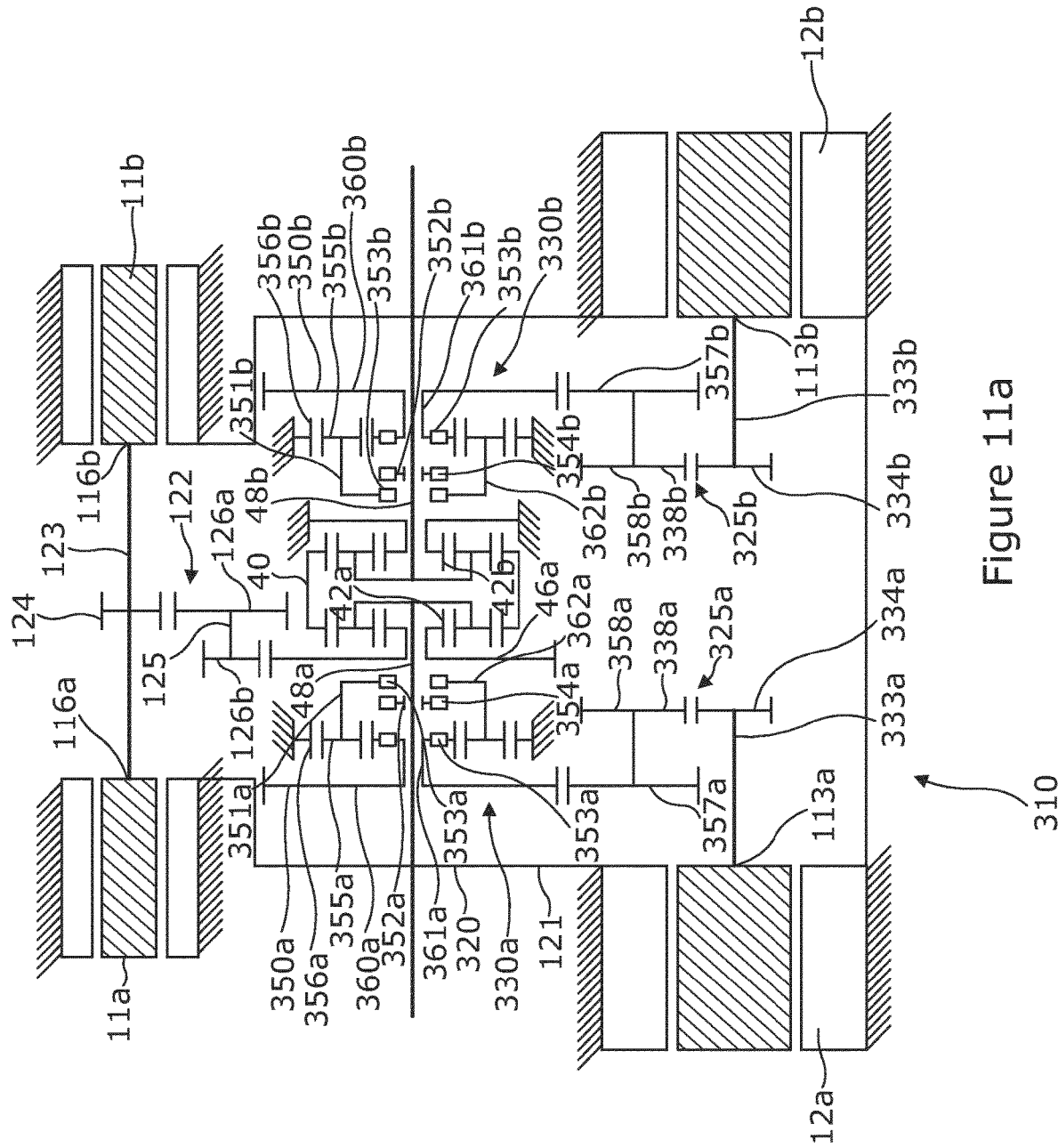
FIG. 11a shows a schematic representation of a drive unit for a skid steered vehicle in accordance with a still further embodiment of the disclosed subject matter.
Figure 11B:
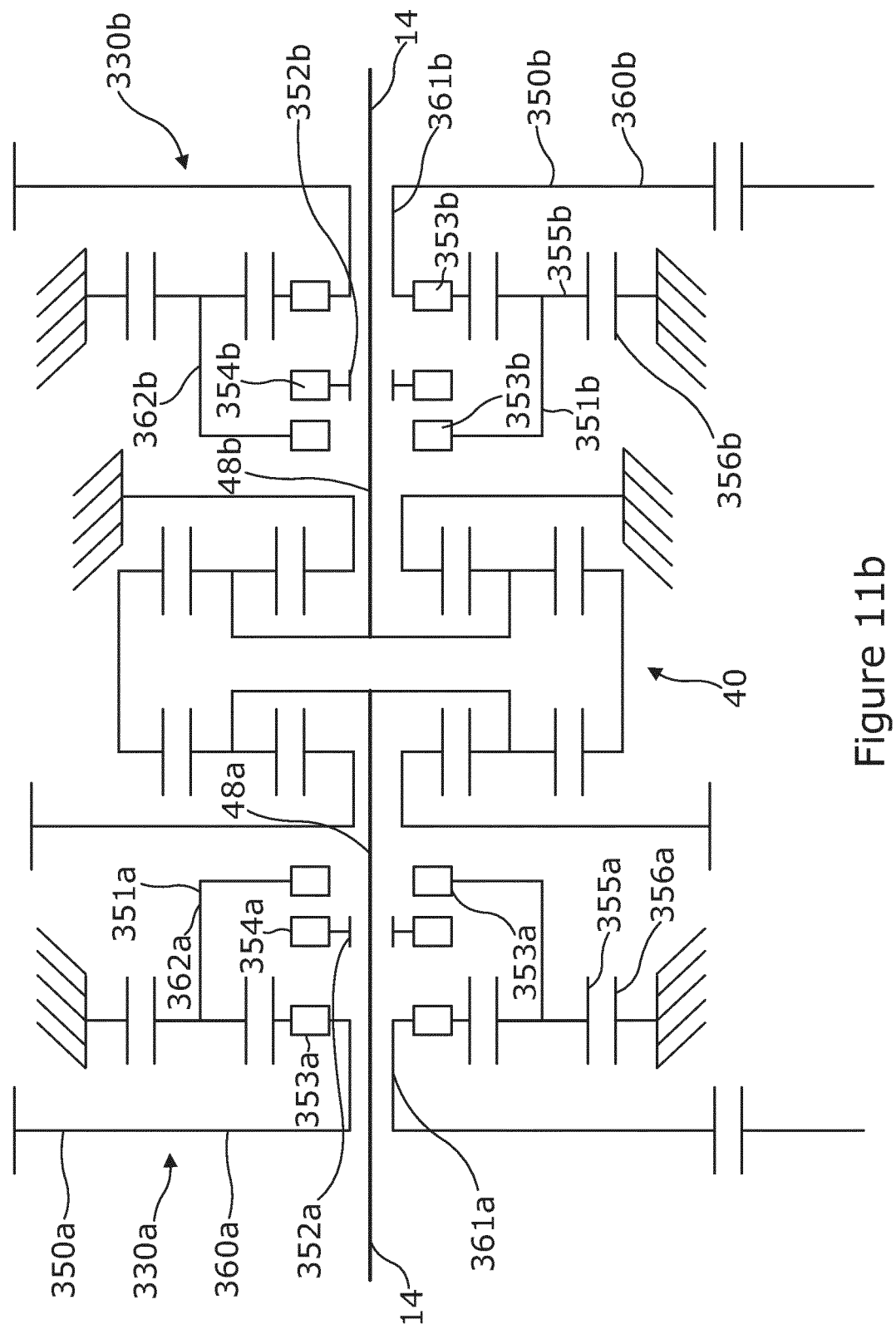

FIG. 11a shows a schematic representation of a drive unit 310 for a skid steered vehicle in accordance with a still further embodiment of the disclosed subject matter. For clarity, like reference numerals to those used above are used for like components. FIG. 11b shows a magnified view of a gear assembly of the drive unit shown in FIG. 11a.

The drive unit 310 of FIG. 11a includes a gearbox 320 which has first and second steering inputs 116a, 116b and first and second propulsion inputs 113a, 113b located on the sides of a housing 121 of the gearbox 320 such that one side of the housing 121 includes the first steering input 116a and the first propulsion input 113a, and the opposing side of the housing 121 includes the second steering input 116b and the second propulsion input 113b. First and second electric steering motors 11a, 11b are connected to the gearbox 320 at the respective first and second steering inputs 116a, 116b, and first and second electric propulsion motors 12a, 12b are connected to the gearbox 320 at the respective first and second propulsion inputs 113a, 113b.

As can be readily seen from FIG. 11a, the arrangement of the controlled differential 40 with respect to the drive shafts 14 and the gearbox outputs 15, and the arrangement of the steering gear arrangement 122 is the same as described above in respect to FIGS. 9 and 10.

The drive unit 310 includes first and second gear change units 330a, 330b in driveable engagement with the propulsion motors 12a, 12b respectively via propulsion gear arrangements 325a, 325b. Each gear change unit 330a, 330b provides drive input to the drive shafts 14 via slideable dog hubs 352a, 352b as described below.

The propulsion gear arrangements 325a, 325b each includes propulsion input shafts 333a, 333b which each have propulsion input gears 334a, 334b fixed thereto, The outboard ends of the propulsion input shafts 333a, 333b form propulsion inputs 113a, 113b of the gearbox 320 respectively. The propulsion gear arrangements 325a, 325b further include compound gears 338a, 338b, wherein each compound gear 338a, 338b includes a first gear wheel 358a, 358b which mesh with the propulsion input gears 334a, 334b respectively, and a second wheel 357a, 357b which mesh with input components 350a, 350b of the gear change units 330a, 330b respectively.

The gear change units 330a, 330b include epicyclic gear sets each having an input component 350a, 350b and an output component 351a, 351b. In this embodiment, the input components 350a, 350b include the sun gears 361a, 361b of the epicyclic gear sets which are fixed to input wheels 360a, 360b respectively. The output components 351a, 351b include the carriers 362a, 362b of the epicyclic gear sets. In an alternative embodiment (not shown) this arrangement could be reversed.

The gear change units 330a, 330b further include planet gears 355a, 355b which mesh with the sun gears 361a, 361b and ring gears 356a, 356b respectively. The ring gears 356a, 356b are fixed against rotation by connection to the gearbox housing 121 directly or via an intermediate rigid link (not shown).

The first and second gear change units 330a, 330b each include a slideable dog hub 352a, 352b respectively which are each connected to a gear shift mechanism (not shown). The slideable dog hubs 352a, 352b are attached to the drive shafts 14 via spline connections (not shown) such that the slideable dog hubs 352a, 352b can slide with respect to the drive shafts 14 but are fixed for rotation therewith.

In use, when the slideable dog hubs 352a, 352b are engaged with the sun (or input) gears 361a, 361b of the gear change units 330a, 330b, power is transmitted to the drive shafts 14 from the propulsion motors 12a, 12b via the propulsion input gears 334a, 334b, the compound gears 338a, 338b, and the sun gears 361a, 361b.

Conversely, when the slideable dog hubs 352a, 352b are engaged with the carriers (or outputs) 362a, 362b of the gear change units 330a, 330b, power is transmitted to the drive shafts 14 from the propulsion motors 12a, 12b via the propulsion input gears 334a, 334b, the compound gears 338a, 338b, the sun gears 361a, 361b and the carriers 362a, 362b.

As can be seen from FIG. 11a, the drive shafts 14 receive drive input from the propulsion motors 12a, 12b in a parallel connection with the outputs 48a, 48b of the controlled differential 40 such that, in use, the speed of the gearbox outputs 15 are determined by the propulsion inputs from the propulsion motors 12a, 12b—via the propulsion gear arrangements 325a, 325b and gear change units 330a, 330b respectively—and the outputs 48a, 48b of the controlled differential 40. The steering motors 11a, 11b are then used to control the controlled differential 40 to steer the vehicle, as needed, as described above in relation to FIG. 1.

Figure 12A:
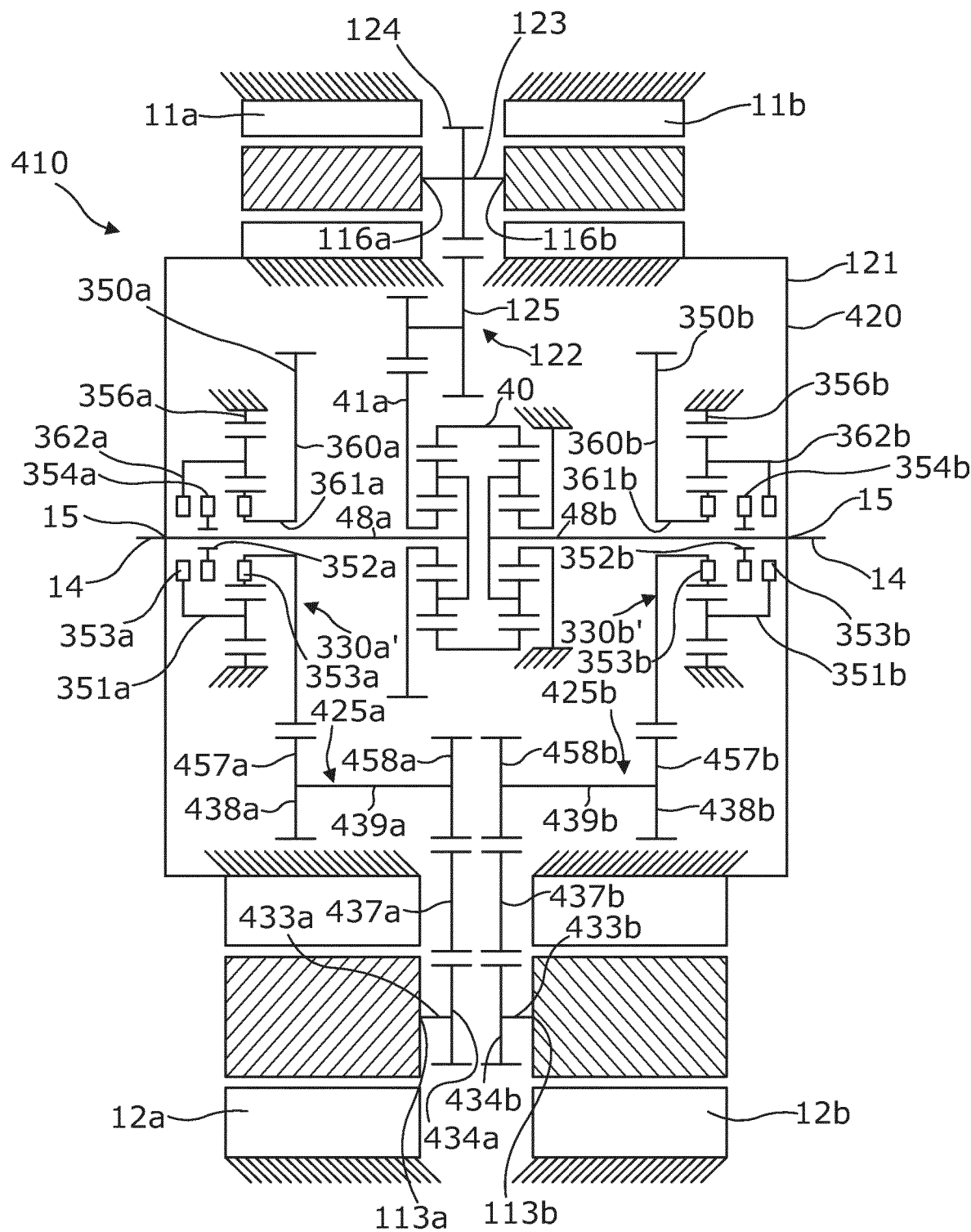
FIG. 12a shows a schematic representation of a drive unit for a skid steered vehicle in accordance with yet another embodiment of the disclosed subject matter.

FIG. 12a shows a schematic representation of a drive unit 410 for a skid steered vehicle in accordance with yet another embodiment of the disclosed subject matter. For clarity, like reference numerals to those used above are used for like components.

The drive unit 410 of FIG. 12a includes a gearbox 420 which has first and second steering inputs 116a, 116b and first and second propulsion inputs 113a, 113b located on the sides of a housing 121 of the gearbox 420 such that one side of the housing 121 includes the first steering input 116a and the first propulsion input 113a, and the opposing side of the housing 121 includes the second steering input 116b and the second propulsion input 113b. First and second electric steering motors 11a, 11b are connected to the gearbox 420 at the respective first and second steering inputs 116a, 116b, and first and second electric propulsion motors 12a, 12b are connected to the gearbox 420 at the respective first and second propulsion inputs 113a, 113b.

The drive unit 410 includes first and second gear change units 330a', 330b' in driveable engagement with the propulsion motors 12a, 12b respectively via propulsion gear arrangements 425a, 425b. Each gear change unit 330a', 330b' provides drive input to the drive shafts 14 via slideable dog hubs 352a, 352b as described below.

As can be readily seen from FIG. 12a, the arrangement of the controlled differential 40 with respect to the drive shafts 14 and the gearbox outputs 15 is the same as described above in respect to FIGS. 9a, 10a and 11a. The steering gear arrangement 122 is the same as described above in respect to FIGS. 9a, 10a and 11a except for the fact that the steering inputs 116a, 116b, are located inboard of the gear change units 330a', 330b'.

The propulsion gear arrangements 425a, 425b each includes propulsion input shafts 433a, 433b which each have propulsion input gears 434a, 434b fixed thereto. The propulsion input shafts 433a, 433b are co-axial with one another and with the major axis of rotation of the propulsion motors 12a, 12b. The outboard ends of the propulsion input shafts 433a, 433b form propulsion inputs 113a, 113b of the gearbox 420 respectively. The propulsion gear arrangements 425a, 425b further include elongate compound gears 438a, 438b, wherein each compound gear 438a, 438b includes a first gear wheel 458a, 458b which mesh with idler gears 437a, 437b respectively. The idler gears 437a, 437b mesh with the propulsion input gears 434a, 434b respectively. Second gear wheels 457a, 457b of the elongate compound gears 438a, 438b mesh with input components 350a, 350b of the gear change units 330a', 330b' respectively.

As shown in FIG. 12a, the compound gears 438a, 438b each have an elongate shaft 439a, 439b which connected the pairs of gear wheels 457a, 458a, 457b, 458b. The combination of the idler gears 437a, 437b and the elongate compound gears 438a, 438b enable transmission of the propulsion inputs 113a, 113b to the input components 350a, 350b of the gear change units 330a', 330b' which lie outboard of the propulsion inputs 113a, 113b and radially inward of the propulsion input shafts 433a, 433b. Hence the propulsion inputs 113a, 113b are located inboard of the gear change units 330a', 330b'.

The gear change units 330a', 330b' include the same components, and operate in the same way, as the gear change units 330a, 330b described above in relation to FIG. 11a except that they are mirror images of the gear change units 330a, 330b of FIG. 11a.

In use, when the slideable dog hubs 352a, 352b are engaged with the sun (or input) gears 361a, 361b of the gear change units 330a', 330b', power is transmitted to the drive shafts 14 from the propulsion motors 12a, 12b via the propulsion input gears 434a, 434b, the idler gears 437a, 437b, the elongate compound gears 438a, 438b, and the sun gears 361a, 361b.

Conversely, when the slideable dog hubs 352a, 352b are engaged with the carriers (or outputs) 362a, 362b of the gear change units 330a', 330b', power is transmitted to the drive shafts 14 from the propulsion motors 12a, 12b via the propulsion input gears 434a, 434b, the idler gears 437a, 437b, the elongate compound gears 438a, 438b, the sun gears 361a, 361b and the carriers 362a, 362b.

As can be seen from FIG. 12a, the drive shafts 14 receive drive input from the propulsion motors 12a, 12b in a parallel connection with the outputs 48a, 48b of the controlled differential 40 such that, in use, the speed of the gearbox outputs 15 are determined by the propulsion inputs from the propulsion motors 12a, 12b—via the propulsion gear arrangements 425a, 425b and gear change units 330a', 330b' respectively—and the outputs 48a, 48b of the controlled differential 40. The steering motors 11a, 11b are then used to control the controlled differential 40 to steer the vehicle, as needed, as described above in relation to FIG. 1.

Figure 12B:
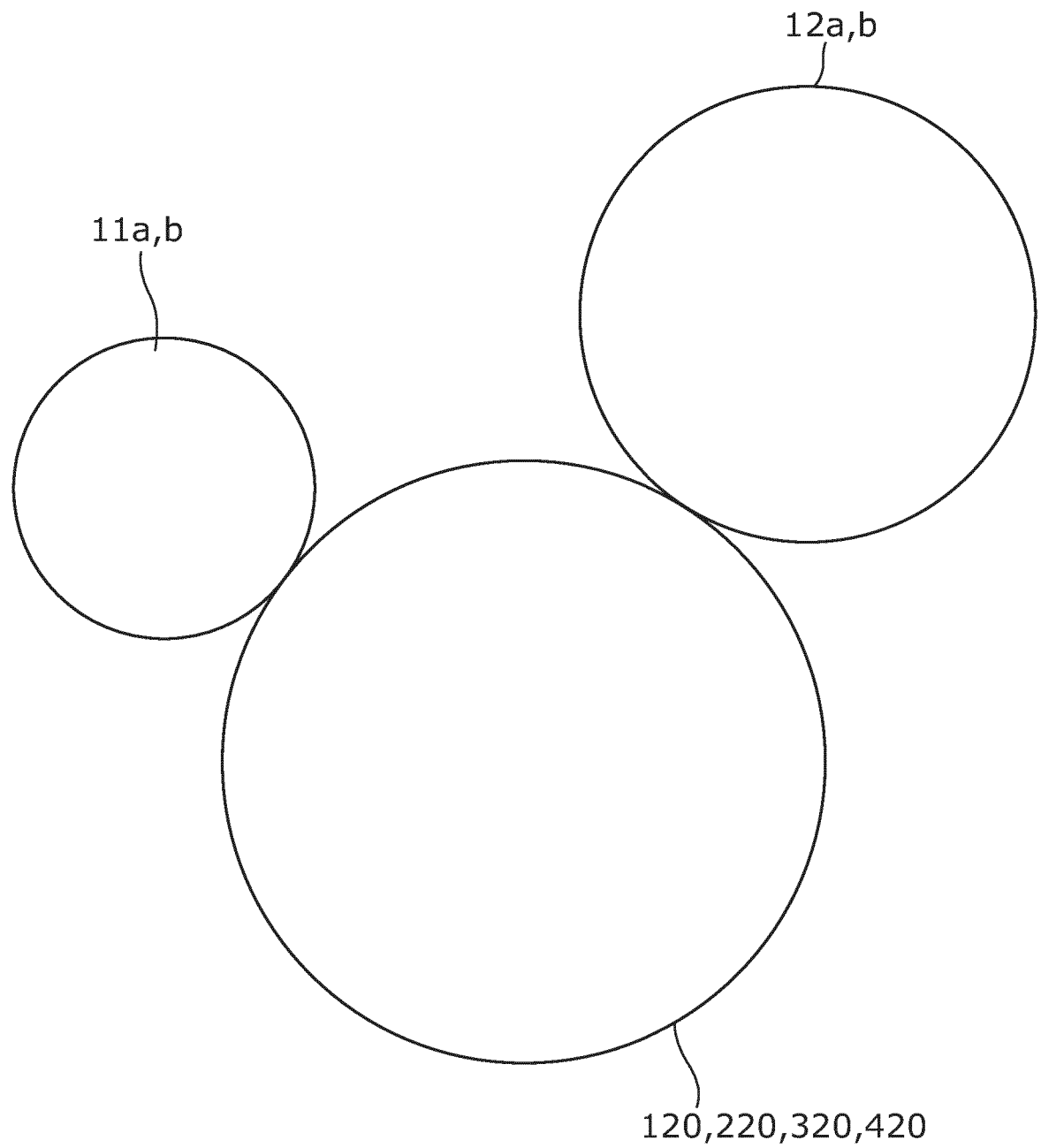

FIG. 12b shows a schematic side outline view of the drive units 110, 210, 310, 410 of FIGS. 9a, 10a, 11a and 12a. It can be seen from this view that the major axes of rotation of the propulsion motors 12a, 12b, and the major axes of rotation of the steering motors 11a, 11b, are radially offset from the major rotation axes of the gearboxes 120, 220, 320, 420 (which corresponds to the major axis of the drive shafts 14), and that the propulsion motors 12a, 12b are circumferentially offset from the steering motors 11a, 11b. Furthermore, FIG. 12b demonstrates that the propulsion motors 12*a*, 12*b* and the steering motors 11*a*, 11*b* are arranged face to face such that the major axes of rotation of the propulsion motors 12*a*, 12*b* are co-axial and the propulsion inputs 113*a*, 113*b* face one another, and the major axes of rotation of the steering motors 11*a*, 11*b* are co-axial and the steering inputs 116*a*, 116*b* face one another. As illustrated in FIG. 12*b*, from the side view the ends of one set of steering and propulsion motors is visible.

Figure 13A:
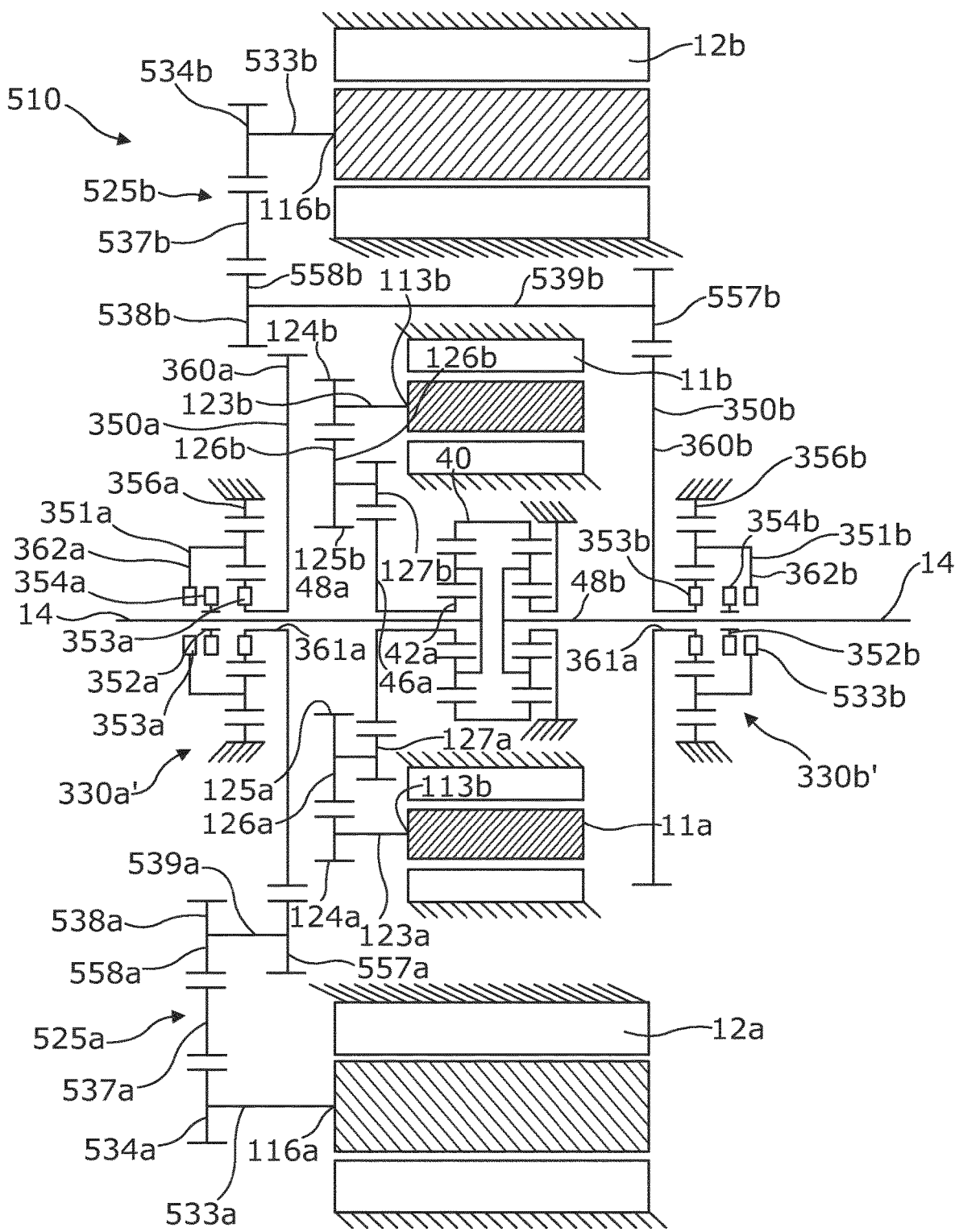
FIG. 13a shows a schematic representation of a drive unit for a skid steered vehicle in accordance with a still further embodiment of the disclosed subject matter.

FIG. 13*a* shows a schematic representation of a drive unit 510 for a skid steered vehicle in accordance with yet another embodiment of the disclosed subject matter. For clarity, like reference numerals to those used above are used for like components.

The drive unit 510 includes first and second steering motors 11*a*, 11*b* which provide first and second steering inputs 116*a*, 116*b* to the drive unit 510, and first and second propulsion motors 12*a*, 12*b* which provide first and second propulsion inputs 113*a*, 113*b* to the drive unit 510.

As can be readily seen from FIG. 13*a*, the arrangement of the controlled differential 40 with respect to the drive shafts 14 and the gearbox outputs 15 is the same as described above in respect to FIGS. 9*a*, 10*a*, 11*a* and 12*a*.

The steering motors 11*a*, 11*b* are each attached to a steering input shaft 123*a*, 123*b* which each include steering input gears 124*a*, 124*b*. Compound gears 125*a*, 125*b* each transmit drive from the steering input gears 124*a*, 124*b* to the sun gear 42*a* of the controlled differential via intermediate steering gear 46*a* which is rigidly fixed to sun gear 42*a*.

The drive unit 510 includes first and second gear change units 330*a*', 330*b*' in driveable engagement with the propulsion motors 12*a*, 12*b* respectively via propulsion gear arrangements 525*a*, 525*b*. Each gear change unit 330*a*', 330*b*' provides drive input to the drive shafts 14 via slideable dog hubs 352*a*, 352*b* as described below.

The propulsion gear arrangements 525*a*, 525*b* each includes propulsion input shafts 533*a*, 533*b* which each have propulsion input gears 534*a*, 534*b* fixed thereto. The propulsion input shafts 533*a*, 533*b* are co-axial with the major axis of rotation of the propulsion motors 12*a*, 12*b* respectively. The propulsion gear arrangements 525*a*, 525*b* further include compound gears 538*a*, 538*b*, wherein each compound gear 538*a*, 538*b* includes a first gear wheel 558*a*, 558*b* which mesh with the propulsion input gears 534*a*, 534*b* respectively (via intermediate gears 537*a*, 537*b*), and second gear wheels 557*a*, 557*b* which drive input components 350*a*, 350*b* of the gear change units 330*a*', 330*b*' respectively.

As shown in FIG. 13*a*, the compound gear 538*b* has an elongate shaft 539*b* which connected the pairs of gear wheels 557*b*, 558*b*. Conversely, the compound gear 538*a* as a relatively shorter shafts 539*a* connecting the pairs of gear wheels 557*a*, 558*a*. The elongate compound gear 538*b* enables transmission of the propulsion input 113*b* to the input component 350*b* of the gear change unit 330*b*' which lies on the opposite side of the controlled differential 40 to the propulsion input 113*b*, and radially inward of the propulsion input shaft 533*b*. Compound gear 358*a* need not be as long since the input component 350*a* of the gear change unit 330*a*' lies on the same side of the controlled differential 40 as the propulsion input 113*a*, radially inward of the propulsion input shaft 533*a*.

The gear change units 330*a*', 330*b*' include the same components, and operate in the same way, as the gear change units 330*a*', 330*b*' described above in relation to FIG. 12*a* (that is, they are mirror images of the gear change units 330*a*, 330*b* of FIG. 11*a*).

In use, when the slideable dog hubs 352*a*, 352*b* are engaged with the sun (or input) gears 361*a*, 361*b* of the gear change units 330*a*', 330*b*', power is transmitted to the drive shafts 14 from the propulsion motors 12*a*, 12*b* via the propulsion input gears 534*a*, 534*b*, the compound gears 538*a*, 538*b* (via intermediate gears 537*a*, 537*b*), and the sun gears 361*a*, 361*b*.

Conversely, when the slideable dog hubs 352*a*, 352*b* are engaged with the carriers (or outputs) 362*a*, 362*b* of the gear change units 330*a*', 330*b*', power is transmitted to the drive shafts 14 from the propulsion motors 12*a*, 12*b* via the propulsion input gears 534*a*, 534*b*, the compound gears 538*a*, 538*b* (via intermediate gears 537*a*, 537*b*), the sun gears 361*a*, 361*b* and the carriers 362*a*, 362*b*.

As can be seen from FIG. 13*a*, the drive shafts 14 receive drive input from the propulsion motors 12*a*, 12*b* in a parallel connection with the outputs 48*a*, 48*b* of the controlled differential 40 such that, in use, the speed of the gearbox outputs 15 are determined by the propulsion inputs from the propulsion motors 12*a*, 12*b*—via the propulsion gear arrangements 525*a*, 525*b* and gear change units 330*a*', 330*b*' respectively—and the outputs 48*a*, 48*b* of the controlled differential 40. The steering motors 11*a*, 11*b* are then used to control the controlled differential 40 to steer the vehicle, as needed, as described above in relation to FIG. 1.

Figure 13B:
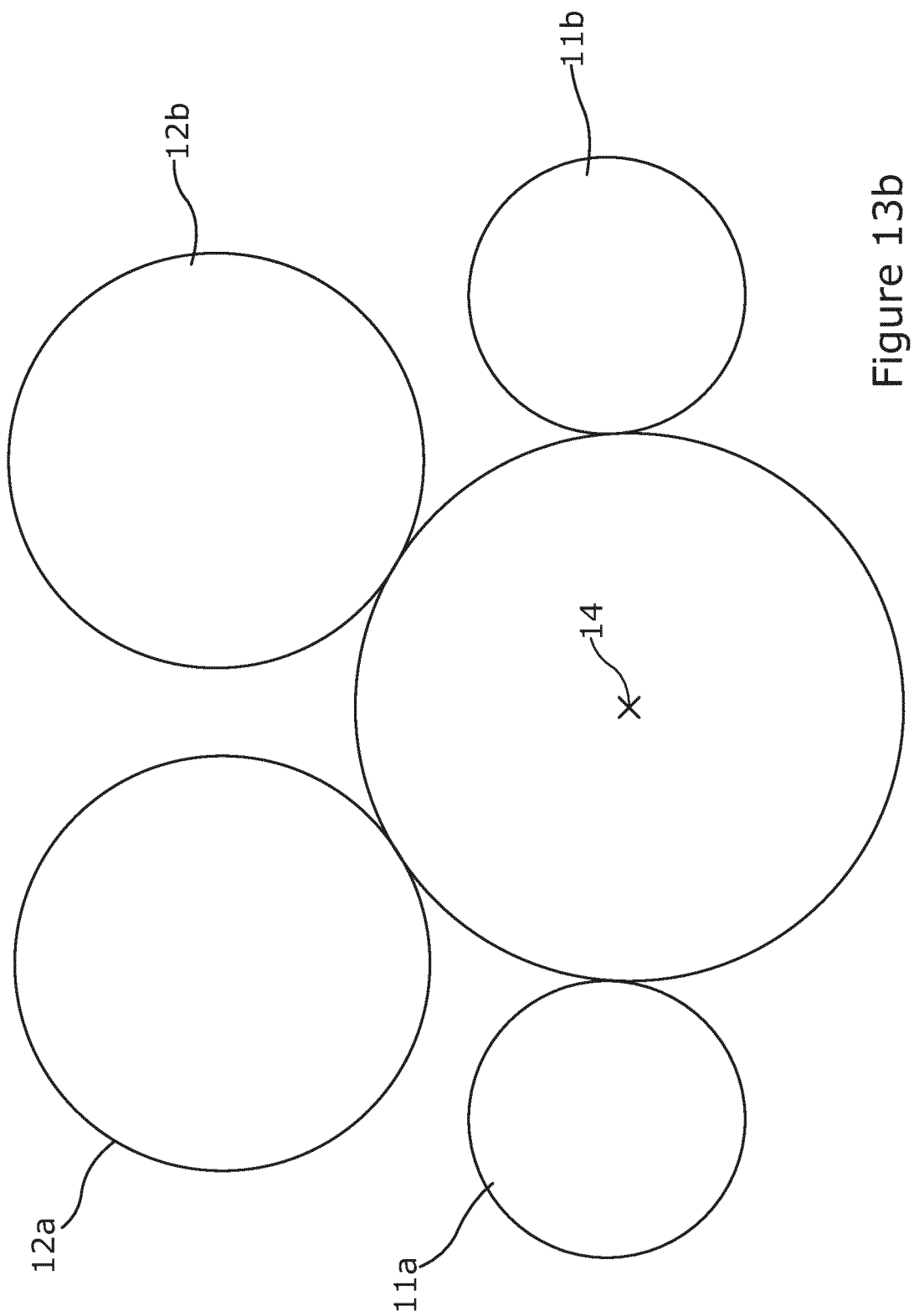

FIG. 13*b* shows a schematic side outline view of the drive unit 510. It can be seen from this view that the propulsion motors 12*a*, 12*b* and the steering motors 11*a*, 11*b* are radially offset from the major axis of the drive shafts 14. The major axes of rotation of the propulsion motors 12*a*, 12*b* define a plane which is offset from the major axes of the drive shafts 14. The major axes of rotation of the propulsion motors 12*a*, 12*b* and the major axes of rotation of the steering motors 11*a*, 11*b* are parallel to the major axes of rotation of the drive shafts 14. In this embodiment, the propulsion motors 12*a*, 12*b* are circumferentially offset from one another (with respect to the major axes of the drive shafts 14) and adjacent to one another such that no motor is located between the propulsion motors 12*a*, 12*b*. The steering motors 11*a*, 11*b* are circumferentially offset from the propulsion motors 12*a*, 12*b* and from one another.

Figures 14A, 14B:
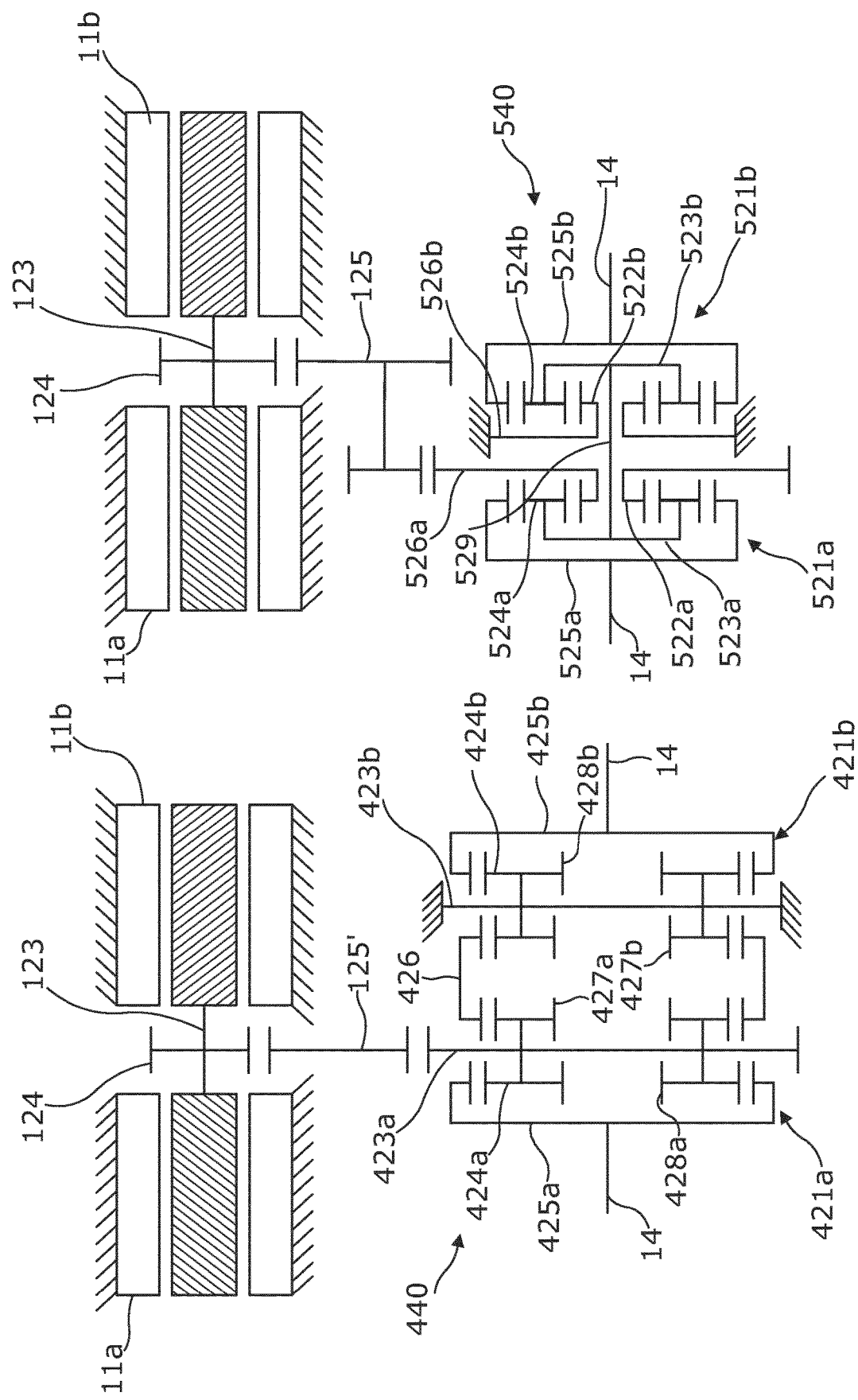
FIGS. 14a to 14c show schematic representations of alternative configurations for the controlled differential shown in FIG. 1.

FIG. 14*a* shows a schematic diagram of an alternative arrangement for a controlled differential 440 for a drive unit 10, 110, 210, 310, 410, 510 of a skid steered vehicle.

The controlled differential 440 includes two epicyclic gear sets 421*a*, 421*b*, each epicyclic gear set 421*a*, 421*b* having a carrier 423*a*, 423*b* located between a pair of ring gears 425*a*, 426*a*, 425*b*, 426*b*. The carriers 423*a*, 423*b* each carry compound planet gears 424*a*, 424*b*, wherein each compound planet gear 424*a*, 424*b* include inner 427*a*, 427*b* and outer 428*a*, 428*b* planet gears mounted on common pinion shafts which pass through the respective carriers 423*a*, 423*b*. The outer planet gears 428*a*, 428*b* mesh with the outermost ring gears 425*a*, 425*b* respectively, and the inner planet gears 427*a*, 427*b* mesh with the innermost ring gears 426*a*, 426*b* respectively. The innermost ring gears 426*a*, 426*b* are fixedly connected to one another for rotation together. Alternatively, the innermost ring gears 426*a*, 426*b* may include a common ring gear common to both epicyclic gear sets 421*a*, 421*b*. The controlled differential 440 has no sun gears.

The innermost ends of the drive shafts 14 are connected to the outer ring gears 425*a*, 425*b* which form the outputs of the controlled differential 440.

The controlled differential 440 is controlled by steer motors 11*a*, 11*b* which share a common steer shaft 123 carrying a steer gear 124 as illustrated in FIGS. 9 to 11. The steer gear 124 is drivably connected to the carrier 423a of one of the epicyclic gear set 421a of the controlled differential 440 via the intermediate compound gear 125 which meshes with teeth (not shown) provided on the outer edge of the carrier 423a of the epicyclic gear set 421a. The carrier 423b of the other epicyclic gear set 421b is fixed against rotation by connection to the gearbox housing or to another fixed location.

FIG. 14b shows a schematic diagram of another alternative arrangement for a controlled differential 540 for a drive unit 10, 110, 210, 310, 410, 510 of a skid steered vehicle. For clarity, like reference numerals are used to indicate like components.

The controlled differential 540 includes two epicyclic gear sets 521a, 521b, each epicyclic gear set 521a, 521b having a sun gear 522a, 522b, a carrier 523a, 523b, and a ring gear 525a, 525b. The carriers 523a, 523b each carry planet gears 524a, 524b which mesh with the ring gears 525a, 525b and the sun gears 522a, 522b respectively. The carriers 523a, 523b of the two epicyclic gear sets 521a, 521b are fixed together by a rigid link 529 such that they are constrained to rotate at the same speed.

The innermost ends of the shafts 14 are connected to the ring gears 525a, 525b which form the outputs of the controlled differential 540.

The controlled differential 540 is controlled by steer motors 11a, 11b which share a common steer shaft 123 carrying a steer gear 124 which is drivably connected to the sun gear 522a of one of the epicyclic gear sets 521a of the controlled differential 540 via an intermediate compound gear 125 and intermediate steering gear 526a. The sun gear 522b of the other epicyclic gear set 521b is fixed against rotation by connection to a housing via intermediate wheel 526b, or to another fixed location on the chassis (not shown) of the skid steered vehicle.

In an alternative arrangement, the sun gear 522b may be drivably connected to the steer shaft 123 by a second intermediate gear set as is known in the art (for example from WO2014/206597). In addition, it is not necessary to provide two steer motors 11a, 11b and one steer motor may be used if desired.

Figure 14C:
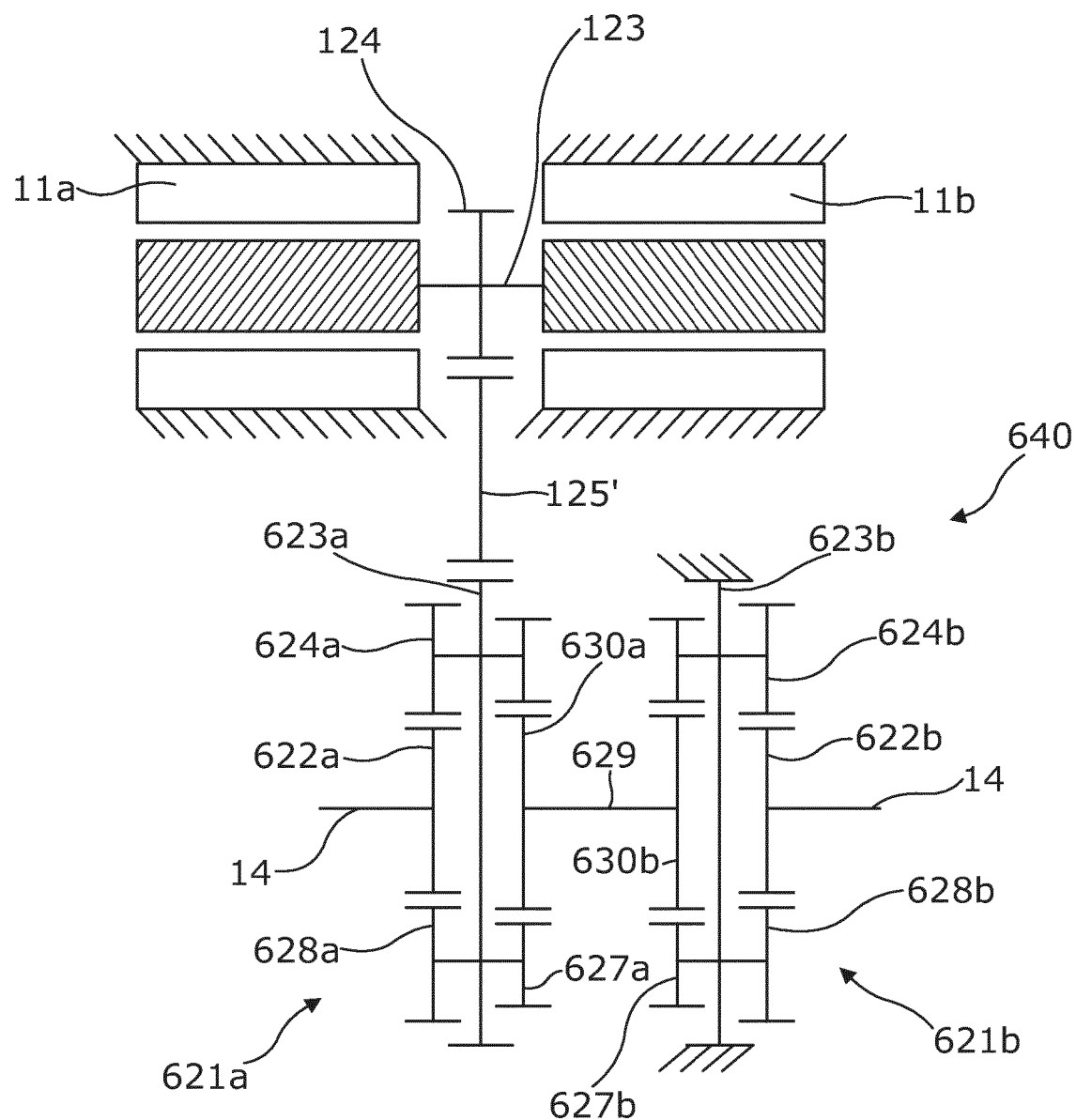

FIG. 14c shows a schematic diagram of a further alternative arrangement for a controlled differential 640 for a drive unit 10, 110, 210, 310, 410, 510 of a skid steered vehicle. For clarity, like reference numerals are used to indicate like components.

The controlled differential 640 includes two epicyclic gear sets 621a, 621b, each epicyclic gear set 621a, 621b having outer sun gears 622a, 622b, inner sun gears 630a, 630b, and a carrier 623a, 623b. The carriers 623a, 623b each carry compound planet gears 624a, 624b, wherein each compound planet gear 624a, 624b include inner and outer planet gears 627a, 627b, 628a, 628b mounted on common pinion shafts which pass through the respective carriers 623a, 623b. The outer planet gears 628a, 628b mesh with the outer sun gears 622a, 622b, and the inner planet gears 627a, 627b mesh with the inner sun gears 630a, 630b respectively. The inner sun gears 630a, 630b of the two epicyclic gear sets 621a, 621b are fixed together by a rigid link 629 such that they are constrained to rotate at the same speed. The controlled differential 640 has no ring gears.

The innermost ends of the shafts 14 are connected to the outer sun gears 622a, 622b which form the outputs of the controlled differential 640.

The controlled differential 640 is controlled by steer motors 11a, 11b which share a common steer shaft 123 carrying a steer gear 124 which is drivably connected to the carrier 623a of one of the epicyclic gear sets 621a of the controlled differential 640 via an intermediate gear 125'. The carrier 623b of the other epicyclic gear set 621b is fixed against rotation by connection to a housing (not shown) of the drive unit, or to another fixed location on the chassis (not shown) of the skid steered vehicle. In an alternative arrangement, the carrier 623b may be drivably connected to the steer shaft 123 by a second intermediate gear set as is known in the art (for example from WO2014/206597). In addition, it is not necessary to provide two steer motors 11a, 11b and one steer motor may be used if desired.

The controlled differentials 440, 540, 640 described above may be used in place of the controlled differentials 40 described above in relation to FIGS. 1 and 9 to 13, wherein all of the remaining features remain unchanged.

Figure 15:
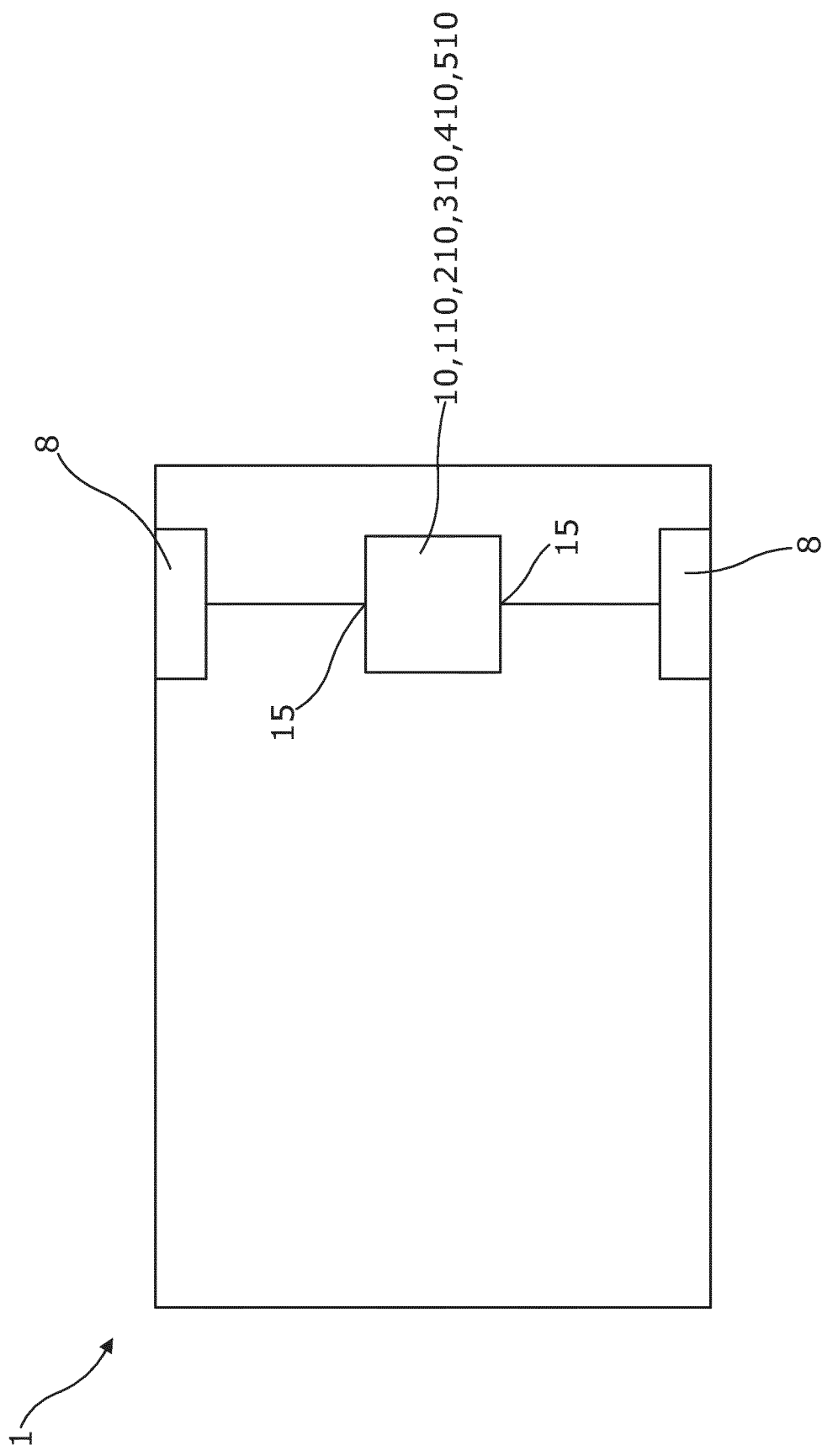
FIG. 15 shows a schematic view of a skid steered vehicle including a drive unit in accordance with an embodiment of the disclosed subject matter.

FIG. 15 shows a schematic representation of a skid steered vehicle 1 including a drive unit 10, 110, 210, 310, 410, 510 in accordance with any of the above describe embodiments. The drive unit 10, 110, 210, 310, 410, 510 is mounted on the skid steered vehicle 1 and drive outputs 15 located on either side of the drive unit 10, 110, 210, 310, 410, 510 are connected to respective drive members 8 located at either side of the vehicle 1.

Figure 16A:
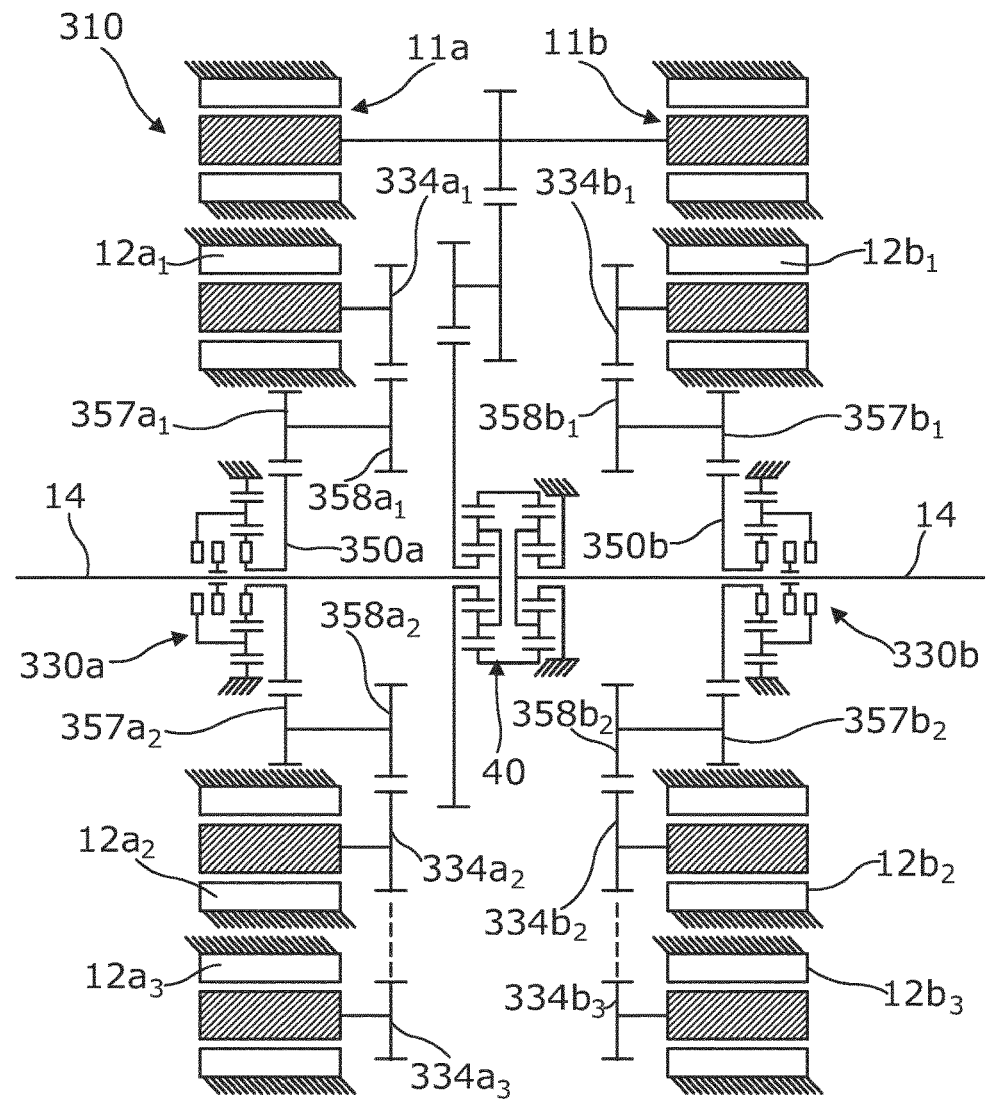
FIG. 16a shows a schematic representation of a variation of the drive unit embodiment of FIG. 11a including a plurality of propulsion motors in driveable engagement with each of the respective gear change units.

FIG. 16a shows a schematic representation of a variation of the drive unit 310 of the embodiment of FIG. 11a. For clarity, like reference numerals are used to reference like components.

In the embodiment illustrated in FIG. 16a, the drive unit 310 includes the same elements as that of FIG. 11a. For example, the drive unit 310 of FIG. 16a includes the same gearbox 320 (not indicated in FIG. 16a) including the same steering gear arrangement 122, same first and second gear change units 330a, 330b, same controlled differential 40, and the same first and second electric steering motors 11a, 11b.

However, in the embodiment of FIG. 16a, the drive unit 310 includes a plurality of propulsion motors $12a_1$, $12a_2$, $12a_3$, $12b_1$, $12b_2$, $12b_3$ associated with each respective gear change unit 330a, 330b rather than a single propulsion motor 12a, 12b associated with each respective gear change unit as described in the earlier embodiment of FIG. 11a. Specifically, propulsion motors $12a_1$, $12a_2$, $12a_3$ are disposed in driveable engagement with gear change unit 330a, and propulsion motors $12b_1$, $12b_2$, $12b_3$ are disposed in driveable engagement with gear change unit 330b.

Arranging a plurality of propulsion motors in this manner in a parallel arrangement enables a reduction in the physical size, weight, power output and torque capability of each of the plurality of propulsion motors compared with the larger, single propulsion motor they replace. There are several benefits to this configuration. Firstly, the traditional propulsion motors as utilised in the embodiment of FIG. 11a (one associated with each respective gear change unit) require custom design, construction and testing which is expensive. The same applies to the electronic inverters required to drive the custom traditional propulsion motors.

Consequently, design and development timescales and costs can be reduced for both the propulsion motors and associated inverter drives by utilising a plurality of COTS propulsion motors.

Furthermore, using identical motors and inverter drives for all of the plural propulsion motors (and optionally also the plural steering motors) enables economies of scale to be enjoyed when specifying the bill of materials for the drive unit 310.

Contrary to received wisdom, Applicant has determined that a single custom propulsion motor can be replaced by a plurality of commercially available (Commercial Off-The-Shelf—COTS) motors arranged in parallel with an attendant surprising weight reduction. Such a configuration has not hitherto been adopted due to a perceived increased component count and consequential perceived increased weight associated therewith.

However, Applicant's present design of the drive unit 310 enables concurrent use/sharing of certain elements the existing drivetrain by all of the plurality of propulsion motors. By way of non-limiting example, in this embodiment the plurality of propulsion motors are all arranged in driveable engagement with one or the other of existing components 350a, 350b (associated with the respective gear change units 330a, 330b). Therefore, existing components 350a, 350b become common to drivetrains of the plurality of propulsion motors, with attendant weight saving over discrete plural drivetrains.

Referring now in more detail to FIG. 16a, the drive unit 310 includes a gearbox 320 (not indicated in FIG. 16a) which has first and second steering inputs 116a, 116b and a plurality of propulsion inputs $113a_1$, $113a_2$, $113a_3$, $113b_1$, $113b_2$, $113b_3$ located on the sides of a housing 121 of the gearbox 320 such that one side of the housing 121 includes the first steering input 116a and propulsion inputs $113a_1$, $113a_2$, $113a_3$ and the opposing side of the housing 121 includes the second steering input 116b and propulsion inputs $113b_1$, $113b_2$, $113b_3$. First and second electric steering motors 11a, 11b are connected to the gearbox 320 at the respective first and second steering inputs 116a, 116b, and the plurality of electric propulsion motors $12a_1$, $12a_2$, $12a_3$, $12b_1$, $12b_2$, $12b_3$ are connected to the gearbox 320 at the respective propulsion inputs $113a_1$, $113a_2$, $113a_3$, $113b_1$, $113b_2$, $113b_3$.

The drive unit 310 includes first and second gear change units 330a, 330b in driveable engagement with the propulsion motors $12a_1$, $12a_2$, $12a_3$, $12b_1$, $12b_2$, $12b_3$ respectively via propulsion gear arrangements $325a_1$, $325a_2$, $325a_3$, $325b_1$, $325b_2$, $325b_3$. Each gear change unit 330a, 330b provides drive input to the drive shafts 14 via slideable dog hubs 352a, 352b as described below.

Propulsion gear arrangements $325a_1$, $325b_1$ include propulsion input shafts $333a_1$, $333b_1$ respectively which have propulsion input gears $334a_1$, $334b_1$ respectively fixed thereto. The outboard ends of the propulsion input shafts $333a_1$, $333b_1$ form propulsion inputs $113a_1$, $113b_1$ of the gearbox 320 respectively. The propulsion gear arrangements $325a_1$, $325b_1$ further include compound gears $338a_1$, $338b_1$ respectively, wherein each compound gear $338a_1$, $338b_1$ includes a first gear wheel $358a_1$, $358b_1$ respectively which mesh with the propulsion input gears $334a_1$, $334b_1$ respectively, and a second wheel $357a_1$, $357b_1$ which mesh with input components 350a, 350b of the gear change units 330a, 330b respectively. Each compound gear $338a_1$, $338b_1$ operates as an idler to transfer torque from the propulsion input gears $334a_1$, $334b_1$ to the input components 350a, 350b of the gear change units 330a, 330b respectively. Alternative to the compound gear arrangement described above, optionally the propulsion gear arrangements $325a_1$, $325b_1$ each include a simple gear train having a single spur gear arranged to operate as an idler to transfer torque from the propulsion input gears $334a_1$, $334b_1$ to the input components 350a, 350b of the gear change units 330a, 330b respectively. Such a configuration would be readily apparent to the informed reader in view of the above description of the compound gear arrangement.

The propulsion gear arrangement $325a_2$, $325b_2$ associated with propulsion motors $12a_2$, $12b_2$ is mutatis mutandis the same as that described above with respect to propulsion motors $12a_1$, $12b_1$.

Specifically, propulsion gear arrangements $325a_2$, $325b_2$ includes propulsion input shafts $333a_2$, $333b_2$ respectively which have propulsion input gears $334a_2$, $334b_2$ respectively fixed thereto. The outboard ends of the propulsion input shafts $333a_2$, $333b_2$ form propulsion inputs $113a_2$, $113b_2$ of the gearbox 320 respectively. The propulsion gear arrangements $325a_2$, $325b_2$ further include compound gears $338a_2$, $338b_2$ respectively, wherein each compound gear $338a_2$, $338b_2$ includes a first gear wheel $358a_2$, $358b_2$ respectively which mesh with the propulsion input gears $334a_2$, $334b_2$ respectively, and a second wheel $357a_2$, $357b_2$ which mesh with input components 350a, 350b of the gear change units 330a, 330b respectively. Each compound gear $338a_2$, $338b_2$ operates as an idler to transfer torque from the propulsion input gears $334a_2$, $334b_2$ to the input components 350a, 350b of the gear change units 330a, 330b respectively. Alternative to the compound gear arrangement described above, optionally the propulsion gear arrangements $325a_2$, $325b_2$ each include a simple gear train having a single spur gear arranged to operate as an idler to transfer torque from the propulsion input gears $334a_2$, $334b_2$ to the input components 350a, 350b of the gear change units 330a, 330b respectively.

Similarly, the propulsion gear arrangement $325a_3$, $325b_3$ associated with propulsion motors $12a_3$, $12b_3$ is mutatis mutandis the same as those described above with respect to propulsion motors $12a_1$, $12a_2$, $12b_1$, $12b_2$.

Specifically, propulsion gear arrangements $325a_3$, $325b_3$ includes propulsion input shafts $333a_3$, $333b_3$ respectively which have propulsion input gears $334a_3$, $334b_3$ respectively fixed thereto. The outboard ends of the propulsion input shafts $333a_3$, $333b_3$ form propulsion inputs $113a_3$, $113b_3$ of the gearbox 320 respectively. The propulsion gear arrangements $325a_3$, $325b_3$ further include compound gears $338a_3$, $338b_3$ respectively, wherein each compound gear $338a_3$, $338b_3$ includes a first gear wheel $358a_3$, $358b_3$ respectively which mesh with the propulsion input gears $334a_3$, $334b_3$ respectively, and a second wheel $357a_3$, $357b_3$ which mesh with input components 350a, 350b of the gear change units 330a, 330b respectively. Each compound gear $338a_3$, $338b_3$ operates as an idler to transfer torque from the propulsion input gears $334a_3$, $334b_3$ to the input components 350a, 350b of the gear change units 330a, 330b respectively. Alternative to the compound gear arrangement described above, optionally the propulsion gear arrangements $325a_3$, $325b_3$ each include a simple gear train having a single spur gear arranged to operate as an idler to transfer torque from the propulsion input gears $334a_3$, $334b_3$ to the input components 350a, 350b of the gear change units 330a, 330b respectively.

The gear change units 330a, 330b include epicyclic gear sets each having an input component 350a, 350b and an output component 351a, 351b. In this embodiment, the input components 350a, 350b include the sun gears 361a, 361b of the epicyclic gear sets which are fixed to input wheels 360a, 360b respectively. The output components 351a, 351b include the carriers 362a, 362b of the epicyclic gear sets. In an alternative embodiment (not shown) this arrangement could be reversed.

The gear change units 330a, 330b further include planet gears 355a, 355b which mesh with the sun gears 361a, 361b and ring gears 356a, 356b respectively. The ring gears 356a, $356b$ are fixed against rotation by connection to the gearbox housing 121 directly or via an intermediate rigid link (not shown).

The first and second gear change units $330a$, $330b$ each include a slideable dog hub $352a$, $352b$ respectively which are each connected to a gear shift mechanism (not shown). The slideable dog hubs $352a$, $352b$ are attached to the drive shafts 14 via spline connections (not shown) such that the slideable dog hubs $352a$, $352b$ can slide with respect to the drive shafts 14 but are fixed for rotation therewith.

In use, when the slideable dog hubs $352a$, $352b$ are engaged with the sun (or input) gears $361a$, $361b$ of the gear change units $330a$, $330b$, power is transmitted to the drive shafts 14 from the propulsion motors $12a_1$, $12a_2$, $12a_3$, $12b_1$, $12b_2$, $12b_3$ via the propulsion input gears $334a_1$, $334a_2$, $334a_3$, $334b_1$, $334b_2$, $334b_3$, the compound gears $338a_1$, $338a_2$, $338a_3$, $338b_1$, $338b_2$, $338b_3$ and the sun gears $361a$, $361b$.

Conversely, when the slideable dog hubs $352a$, $352b$ are engaged with the carriers (or outputs) $362a$, $362b$ of the gear change units $330a$, $330b$, power is transmitted to the drive shafts 14 from the propulsion motors $12a_1$, $12a_2$, $12a_3$, $12b_1$, $12b_2$, $12b_3$ via the propulsion input gears $334a_1$, $334a_2$, $334a_3$, $334b_1$, $334b_2$, $334b_3$, the compound gears $338a_1$, $338a_2$, $338a_3$, $338b_1$, $338b_2$, $338b_3$, the sun gears $361a$, $361b$ and the carriers $362a$, $362b$.

As can be seen from FIG. 16a, the drive shafts 14 receive drive input from the propulsion motors $12a_1$, $12a_2$, $12a_3$, $12b_1$, $12b_2$, $12b_3$ in a parallel connection with the outputs $48a$, $48b$ of the controlled differential 40 such that, in use, the speed of the gearbox outputs 15 are determined by the propulsion inputs from the propulsion motors $12a_1$, $12a_2$, $12a_3$, $12b_1$, $12b_2$, $12b_3$—via the propulsion gear arrangements $325a_1$, $325a_2$, $325a_3$, $325b_1$, $325b_2$, $325b_3$ and gear change units $330a$, $330b$ respectively—and the outputs $48a$, $48b$ of the controlled differential 40. The steering motors $11a$, $11b$ are then used to control the controlled differential 40 to steer the vehicle, as needed, as described above in relation to FIG. 1.

Although the embodiment of FIG. 16a includes six propulsion motors $12a_1$, $12a_2$, $12a_3$, $12b_1$, $12b_2$, and $12b_3$, optionally the drive unit 310 includes a number of propulsion motors greater or a smaller than six. By way of non-limiting example, in one variation of the embodiment (not illustrated) the drive unit includes four propulsion motors $12a_1$, $12a_2$, $12b_1$, and $12b_2$. In another non-limiting example, an alternative variation of the embodiment (not illustrated) includes a drive unit including eight propulsion motors $12a_1$, $12a_2$, $12a_3$, $12a_4$, $12b_1$, $12b_2$, $12b_3$, $12b_4$, arranged in parallel driveable engagement.

Figure 16B:
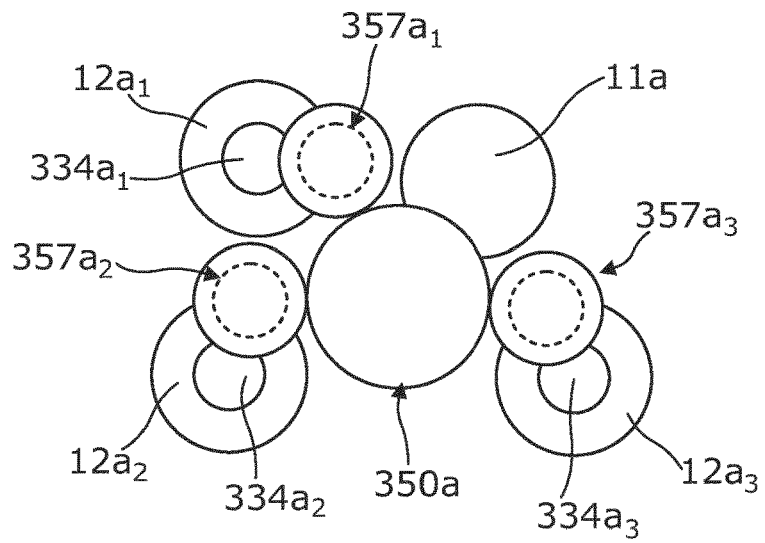
FIG. 16b shows a schematic representation of an end view of the first gear change unit of the drive unit of FIG. 16a. The end view illustrates the arrangement of the plurality of propulsion motors in driveable engagement with the first gear change unit.

FIG. 16b shows a schematic representation of an end view of the first gear change unit of the drive unit of FIG. 16a. The end view illustrates the arrangement of the plurality of propulsion motors in driveable engagement with the first gear change unit.

Figure 16C:
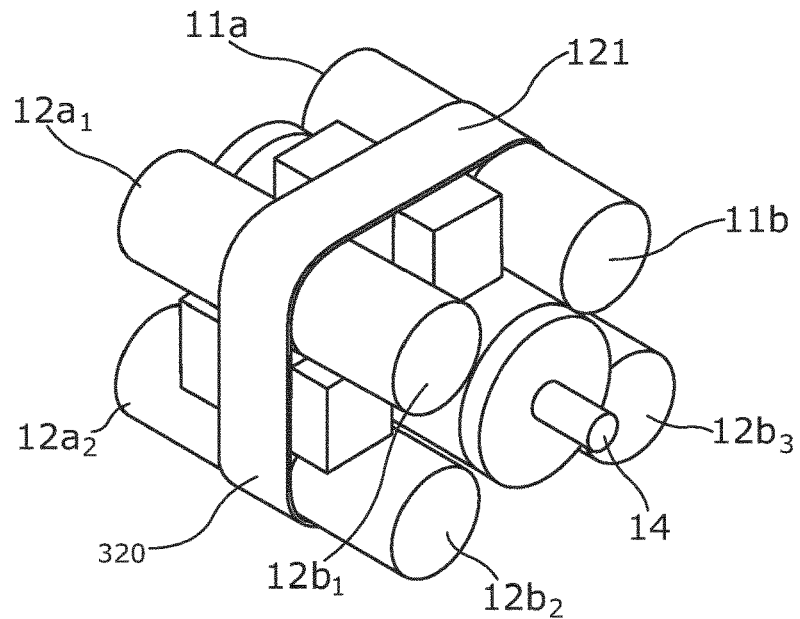
FIG. 16c shows a schematic isometric view of the drive unit embodiment of FIG. 16a illustrating the plurality of propulsion motors associated with each of the gear change units.

FIG. 16c shows a schematic isometric view of the drive unit embodiment of FIG. 16a illustrating the plurality of propulsion motors associated with each of the gear change units.

Figure 17A:
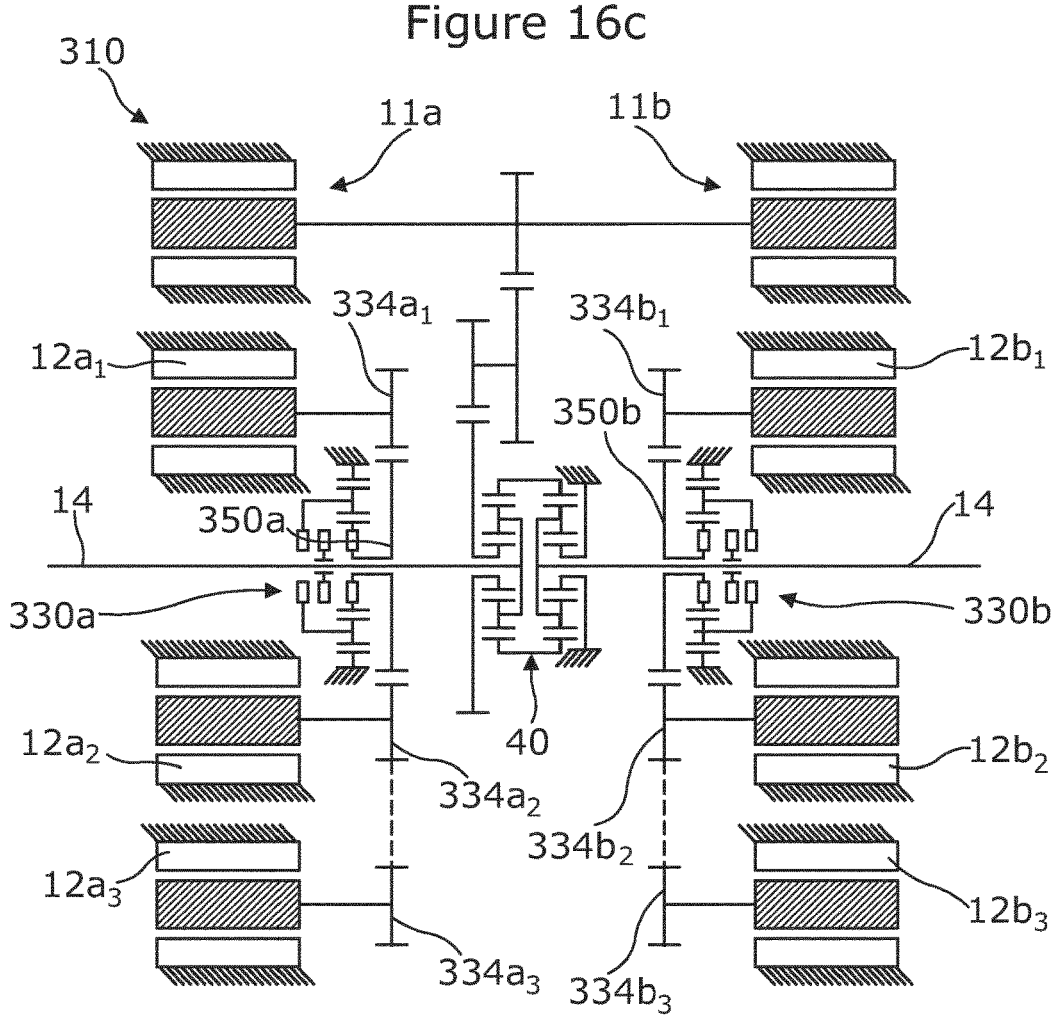
FIG. 17a shows a schematic representation of a variation of the drive unit embodiment of FIG. 16a including a plurality of propulsion motors in driveable engagement with each of the respective gear change units.

FIG. 17a shows a schematic representation of a variation of the drive unit embodiment of FIG. 16a including a plurality of propulsion motors in driveable engagement with each of the gear change units. For clarity, like reference numerals are used to reference like components.

The drive unit 310 illustrated in FIG. 17a differs from that of FIG. 16a in that the plurality of propulsion motors $12a_1$, $12a_2$, $12a_3$, $12b_1$, $12b_2$, $12b_3$ are disposed in direct driveable engagement with the input components $350a$, $350b$ of the gear change units $330a$, $330b$ respectively rather than indirectly via the intermediate propulsion gear arrangements $325a_1$, $325a_2$, $325a_3$, $325b_1$, $325b_2$, $325b_3$ (idler gears) as in the previous embodiment. In this embodiment the propulsion gear arrangements $325a_1$, $325a_2$, $325a_3$, $325b_1$, $325b_2$, $325b_3$ (idler gears) are omitted. The number of component parts included within the drive unit is therefore reduced compared with the previous embodiment with attendant reduction in complexity, cost and weight.

Referring now in more detail to FIG. 17a, the drive unit 310 includes a gearbox 320 (not indicated in FIG. 17a) which has first and second steering inputs $116a$, $116b$ and a plurality of propulsion inputs $113a_1$, $113a_2$, $113a_3$, $113b_1$, $113b_2$, $113b_3$ located on the sides of a housing 121 of the gearbox 320 such that one side of the housing 121 includes the first steering input $116a$ and propulsion inputs $113a_1$, $113a_2$, $113a_3$ and the opposing side of the housing 121 includes the second steering input $116b$ and propulsion inputs $113b_1$, $113b_2$, $113b_3$. First and second electric steering motors $11a$, $11b$ are connected to the gearbox 320 at the respective first and second steering inputs $116a$, $116b$, and the plurality of electric propulsion motors $12a_1$, $12a_2$, $12a_3$, $12b_1$, $12b_2$, $12b_3$ are connected to the gearbox 320 at the respective propulsion inputs $113a_1$, $113a_2$, $113a_3$, $113b_1$, $113b_2$, $113b_3$.

The drive unit 310 includes first and second gear change units $330a$, $330b$ in driveable engagement with the propulsion motors $12a_1$, $12a_2$, $12a_3$, $12b_1$, $12b_2$, $12b_3$ respectively via the propulsion input gears (alternatively referred to as propulsion motor pinions) $334a_1$, $334a_2$, $334a_3$, $334b_1$, $334b_2$, $334b_3$. Each gear change unit $330a$, $330b$ provides drive input to the drive shafts 14 via slideable dog hubs $352a$, $352b$ as described below.

Specifically, propulsion motors $12a_1$, $12b_1$ are arranged in driveable engagement with the propulsion inputs $113a_1$, $113b_1$ respectively of the gearbox 320.

Propulsion input shafts $333a_1$, $333b_1$ have propulsion input gears $334a_1$, $334b_1$ respectively fixed thereto. The outboard ends of the propulsion input shafts $333a_1$, $333b_1$ form propulsion inputs $113a_1$, $113b_1$ of the gearbox 320 respectively. In this embodiment propulsion input gears $334a_1$, $334b_1$ mesh directly with respective input components $350a$, $350b$ of the gear change units $330a$, $330b$ respectively. Torque is therefore transferred from the propulsion input gears $334a_1$, $334b_1$ directly to the input components $350a$, $350b$ of the respective gear change units $330a$, $330b$.

The configuration of propulsion motors $12a_2$, $12b_2$ is mutatis mutandis the same as that described above with respect to propulsion motors $12a_1$, $12b_1$.

Propulsion input shafts $333a_2$, $333b_2$ have propulsion input gears $334a_2$, $334b_2$ respectively fixed thereto. The outboard ends of the propulsion input shafts $333a_2$, $333b_2$ form propulsion inputs $113a_2$, $113b_2$ of the gearbox 320 respectively. The propulsion motors $12a_2$, $12b_2$ are arranged in driveable engagement with the propulsion inputs $113a_2$, $113b_2$ respectively. The propulsion input gears $334a_2$, $334b_2$ mesh directly with respective input components $350a$, $350b$ of the gear change units $330a$, $330b$ respectively. Torque is therefore transferred from the propulsion input gears $334a_2$, $334b_2$ directly to the input components $350a$, $350b$ of the respective gear change units $330a$, $330b$.

Similarly, the configuration of propulsion motors $12a_3$, $12b_3$ is mutatis mutandis the same as those described above with respect to propulsion motors $12a_1$, $12a_2$, $12b_1$, $12b_2$.

Propulsion input shafts $333a_3$, $333b_3$ have propulsion input gears $334a_3$, $334b_3$ respectively fixed thereto. The outboard ends of the propulsion input shafts $333a_3$, $333b_3$ form propulsion inputs $113a_3$, $113b_3$ of the gearbox 320 respectively. The propulsion motors $12a_3$, $12b_3$ are arranged in driveable engagement with the propulsion inputs $113a_3$, $113b_3$ respectively. The propulsion input gears $334a_3$, $334b_3$ mesh directly with respective input components 350a, 350b of the gear change units 330a, 330b respectively. Torque is therefore transferred from the propulsion input gears $334a_3$, $334b_3$ directly to the input components 350a, 350b of the respective gear change units 330a, 330b.

In common with FIG. 16a, the gear change units 330a, 330b include epicyclic gear sets each having an input component 350a, 350b and an output component 351a, 351b. The input components 350a, 350b include the sun gears 361a, 361b of the epicyclic gear sets which are fixed to input wheels 360a, 360b respectively. The output components 351a, 351b include the carriers 362a, 362b of the epicyclic gear sets. In an alternative embodiment (not shown) this arrangement could be reversed.

The gear change units 330a, 330b further include planet gears 355a, 355b which mesh with the sun gears 361a, 361b and ring gears 356a, 356b respectively. The ring gears 356a, 356b are fixed against rotation by connection to the gearbox housing 121 directly or via an intermediate rigid link (not shown).

The first and second gear change units 330a, 330b each include a slideable dog hub 352a, 352b respectively which are each connected to a gear shift mechanism (not shown). The slideable dog hubs 352a, 352b are attached to the drive shafts 14 via spline connections (not shown) such that the slideable dog hubs 352a, 352b can slide with respect to the drive shafts 14 but are fixed for rotation therewith.

In use, when the slideable dog hubs 352a, 352b are engaged with the sun (or input) gears 361a, 361b of the gear change units 330a, 330b, power is transmitted to the drive shafts 14 from the propulsion motors $12a_1$, $12a_2$, $12a_3$, $12b_1$, $12b_2$, $12b_3$ via the propulsion input gears $334a_1$, $334a_2$, $334a_3$, $334b_1$, $334b_2$, $334b_3$, and the sun gears 361a, 361b.

Conversely, when the slideable dog hubs 352a, 352b are engaged with the carriers (or outputs) 362a, 362b of the gear change units 330a, 330b, power is transmitted to the drive shafts 14 from the propulsion motors $12a_1$, $12a_2$, $12a_3$, $12b_1$, $12b_2$, $12b_3$ via the propulsion input gears $334a_1$, $334a_2$, $334a_3$, $334b_1$, $334b_2$, $334b_3$, the sun gears 361a, 361b and the carriers 362a, 362b.

As can be seen from FIG. 17a, the drive shafts 14 receive drive input from the propulsion motors $12a_1$, $12a_2$, $12a_3$, $12b_1$, $12b_2$, $12b_3$ in a parallel connection with the outputs 48a, 48b of the controlled differential 40 such that, in use, the speed of the gearbox outputs 15 are determined by the propulsion inputs from the propulsion motors $12a_1$, $12a_2$, $12a_3$, $12b_1$, $12b_2$, $12b_3$—via the propulsion input gears $334a_1$, $334a_2$, $334a_3$, $334b_1$, $334b_2$, $334b_3$, and gear change units 330a, 330b respectively—and the outputs 48a, 48b of the controlled differential 40. The steering motors 11a, 11b are then used to control the controlled differential 40 to steer the vehicle, as needed, as described above in relation to FIG. 1.

Although the embodiment of FIG. 17a includes six propulsion motors $12a_1$, $12a_2$, $12a_3$, $12b_1$, $12b_2$, and $12b_3$, optionally the drive unit 310 includes a number of propulsion motors greater or a smaller than six. By way of non-limiting example, in one variation of the embodiment (not illustrated) the drive unit includes four propulsion motors $12a_1$, $12a_2$, $12b_1$, and $12b_2$. In another non-limiting example, an alternative variation of the embodiment (not illustrated) includes a drive unit including eight propulsion motors $12a_1$, $12a_2$, $12a_3$, $12a_4$, $12b_1$, $12b_2$, $12b_3$, $12b_4$, arranged in parallel driveable engagement.

Figure 17B:
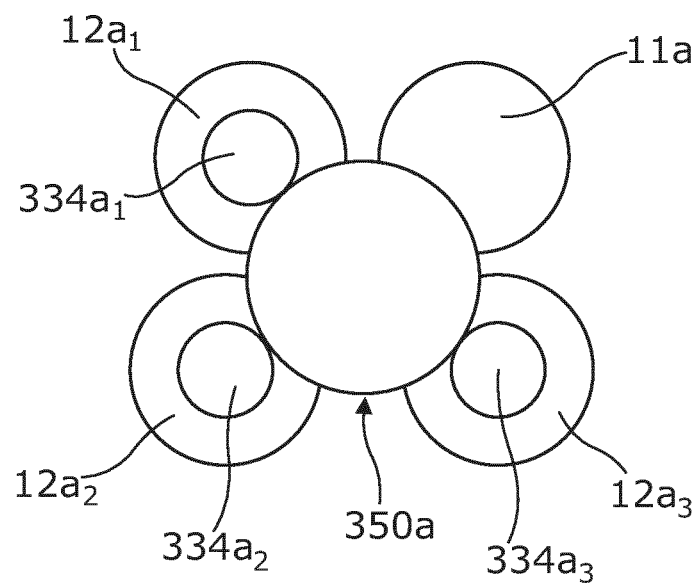
FIG. 17b shows a schematic representation of an end view of the first gear change unit of the drive unit of FIG. 17a. The end view illustrates the arrangement of the plurality of propulsion motors in driveable engagement with the first gear change unit.

FIG. 17b shows a schematic representation of an end view of the first gear change unit of the drive unit of FIG. 17a. The end view illustrates the arrangement of the plurality of propulsion motors in direct driveable engagement with the first gear change unit.

Figure 17C:
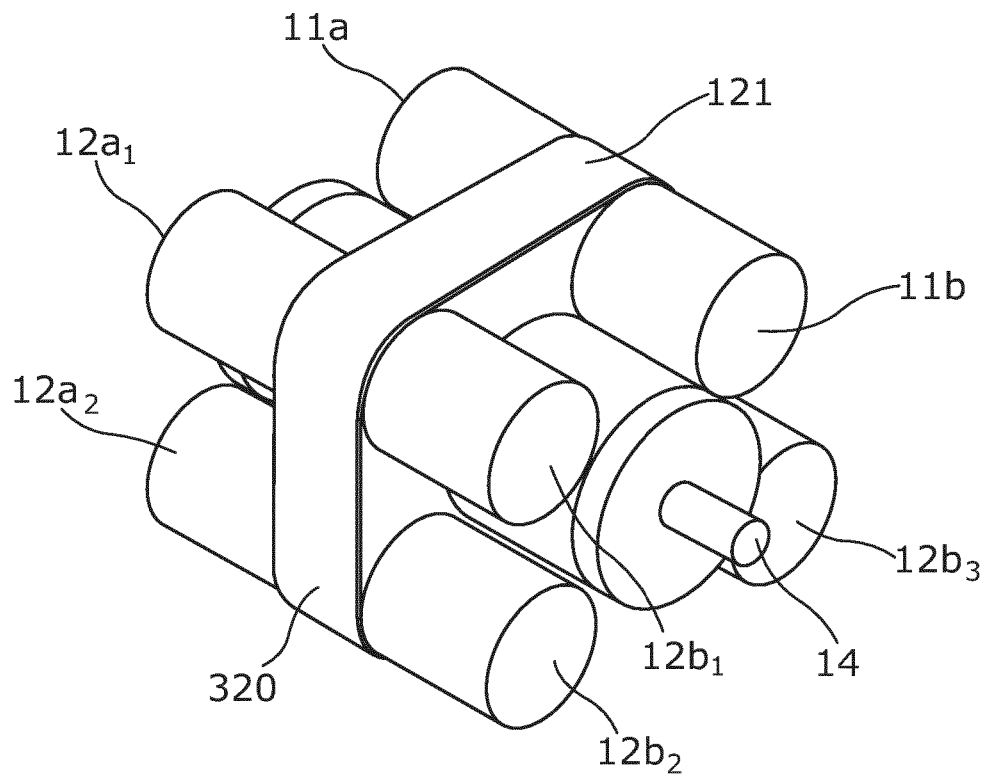
FIG. 17c shows a schematic isometric view of the drive unit embodiment of FIG. 17a illustrating the plurality of propulsion motors associated with each of the gear change units.

FIG. 17c shows a schematic isometric view of the drive unit embodiment of FIG. 17a illustrating the plurality of propulsion motors associated with each of the gear change units.

Figure 18A:
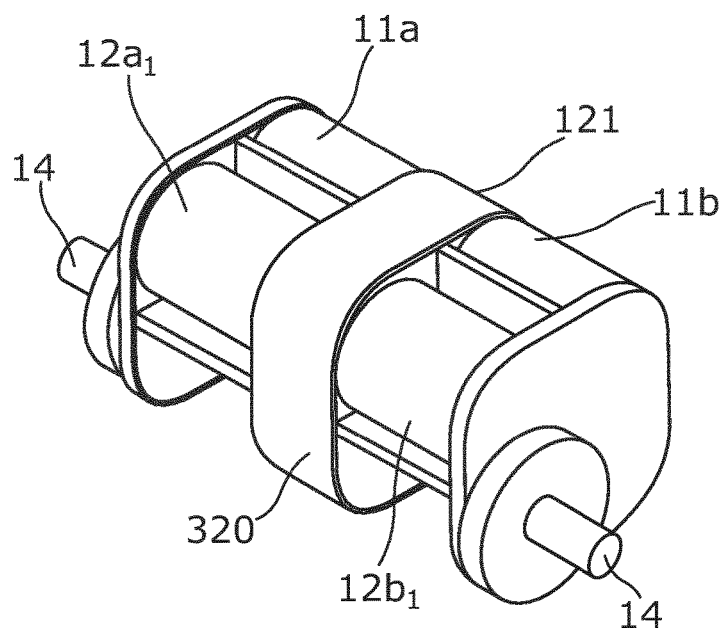

FIG. 18a shows a schematic isometric view of a drive unit 310 in accordance with either of the embodiments of FIG. 16a or 17a. In this embodiment the drive unit 310 includes four propulsion motors $12a_1$, $12a_2$, $12b_1$, and $12b_2$ arranged in two groups with the gearbox 320 disposed between the first and second groups. The gearbox 320 has first and second steering inputs 116a, 116b and propulsion inputs $113a_1$, $113a_2$, $113b_1$, $113b_2$ located on opposing sides of a housing 121 of the gearbox 320. One side of the housing 121 includes the first steering input 116a and the first propulsion inputs $113a_1$, $113a_2$ and the opposing side of the housing 121 includes the second steering input 116b and the second propulsion inputs $113b_1$, $113b_2$. First and second electric steering motors 11a, 11b are connected to the gearbox 320 at the respective first and second steering inputs 116a, 116b in a face-to-face arrangement. The electric propulsion motors $12a_1$, $12a_2$, $12b_1$, and $12b_2$ are connected to the gearbox 320 at the respective propulsion inputs $113a_1$, $113a_2$, $113b_1$, $113b_2$ in a face-to-face arrangement with the longitudinal axes of the electric propulsion motors $12a_1$, $12a_2$, $12b_1$, and $12b_2$ arranged substantially parallel to the main drive shafts 14 and the gear change units 330a, 330b. As can be seen in FIG. 18a the drive shafts 14 are laterally offset from the electric steering motors 11a, 11b and the plurality of electric propulsion motors $12a_1$, $12a_2$, $12b_1$, and $12b_2$ which are arranged in a close-packed arrangement for improved packaging efficiency.

Figure 18B:
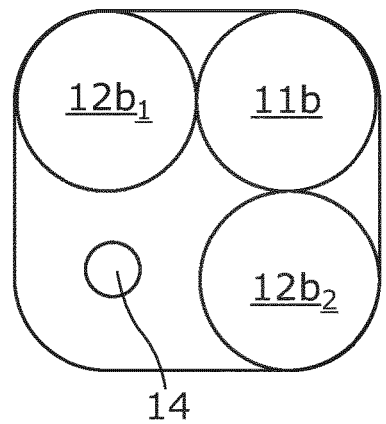

FIG. 18b shows a schematic representation of a partial cutaway end view of a gearbox in accordance with the embodiment of FIG. 18a.

Figure 18C:
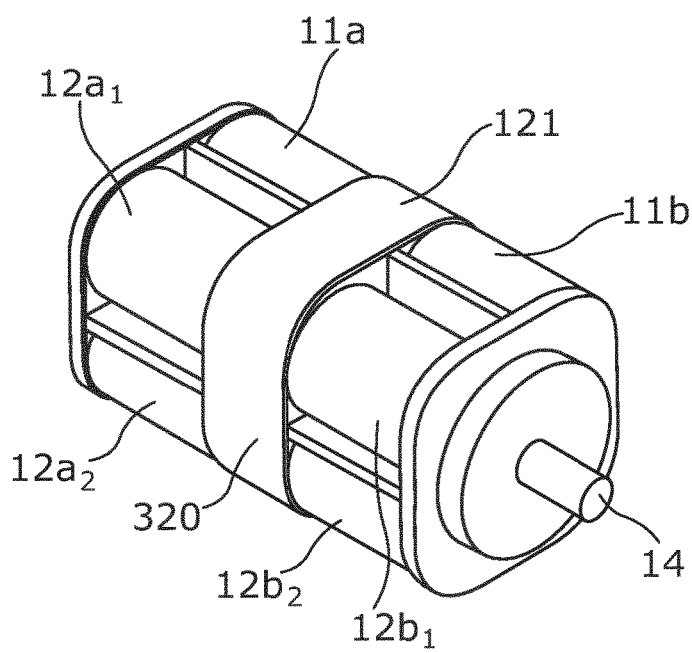

FIG. 18c shows a schematic isometric view of an alternative drive unit 310 in accordance with either of the embodiments of FIG. 16a or 17a. In this embodiment the drive unit 310 includes six propulsion motors $12a_1$, $12a_2$, $12a_3$, $12b_1$, $12b_2$ and $12b_3$ arranged in two groups with the gearbox 320 disposed between the first and second groups. The gearbox 320 has first and second steering inputs 116a, 116b and propulsion inputs $113a_1$, $113a_2$, $113a_3$, $113b_1$, $113b_2$, and $113b_3$ located on opposing sides of a housing 121 of the gearbox 320. One side of the housing 121 includes the first steering input 116a and the first propulsion inputs $113a_1$, $113a_2$, $113a_3$ and the opposing side of the housing 121 includes the second steering input 116b and the second propulsion inputs $113b_1$, $113b_2$, and $113b_3$. First and second electric steering motors 11a, 11b are connected to the gearbox 320 at the respective first and second steering inputs 116a, 116b in a face-to-face arrangement. The electric propulsion motors $12a_1$, $12a_2$, $12a_3$, $12b_1$, $12b_2$ and $12b_3$ are connected to the gearbox 320 at the respective propulsion inputs $113a_1$, $113a_2$, $113a_3$, $113b_1$, $113b_2$, and $113b_3$ in a face-to-face arrangement with the longitudinal axes of the electric propulsion motors $12a_1$, $12a_2$, $12a_3$, $12b_1$, $12b_2$ and $12b_3$ arranged substantially parallel to the main drive shafts 14 and the gear change units 330a, 330b. As can be seen in FIG. 18a the electric steering motors 11a, 11b and the plurality of electric propulsion motors $12a_1$, $12a_2$, $12a_3$, $12b_1$, $12b_2$ and $12b_3$ are arranged substantially radially offset from and surrounding the drive shafts 14 in a close-packed arrangement for enhanced packaging efficiency.

Figure 18D:
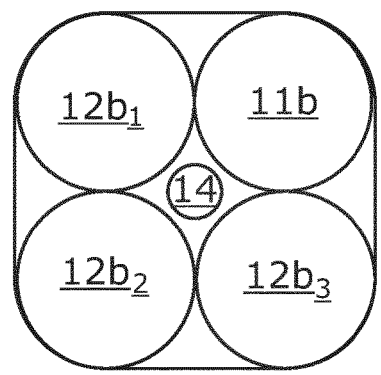
FIG. 18d shows a schematic representation of a partial cutaway end view of a gearbox in accordance with the embodiment of FIG. 18c.

FIG. 18d shows a schematic representation of a partial cutaway end view of a gearbox in accordance with the embodiment of FIG. 18c.

While the embodiments of FIGS. 16a and 17a are described hereinbefore with respect to foregoing embodiment 11a, it will be readily apparent to the informed reader that the parallel arrangement of the plurality of propulsion motors therein is equally applicable mutatis mutandis to all of the other embodiments of the disclosed subject matter described herein.

Although embodiments of the presently disclosed subject matter have been described in the preceding paragraphs with reference to various examples, it should be appreciated that modifications to the examples given can be made without departing from the scope of the disclosed subject matter as claimed.

Where a structural feature has been described, it may be replaced by performing one or more of the functions of the structural feature whether that function or those functions are explicitly or implicitly described.

The term "included" is used in this document with an inclusive not an exclusive meaning. That is any reference to X including Y indicates that X may include only one Y or may include more than one Y. If it is intended to use "include" with an exclusive meaning than it will be made clear in the context by referring to "including only one . . . " or by using "consisting".

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the disclosed subject matter believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gearbox for a skid steered vehicle, the gearbox comprising:
    a housing having first and second opposing sides;
    a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs;
    a steering input shaft in driveable communication with the controlled differential, wherein one end of the steering input shaft forms a steering input to the gearbox;
    a propulsion input shaft in driveable communication with the gearbox outputs, wherein one end of the propulsion input shaft forms a propulsion input to the gearbox;
    a gear reduction unit and/or a gear change unit in driveable communication with the gearbox outputs, wherein the propulsion input shaft, the gear reduction unit and/or the gear change unit are connected in a parallel connection with an output of the controlled differential to the gearbox outputs, and wherein the steering input and the propulsion input are located on the same side of the gearbox housing; and
    at least one drive shaft having a primary drive gear fixed thereto;
    the propulsion input shaft including a propulsion input and a propulsion input gear fixed thereto; and
    the gear change unit including,
        a gear input shaft having first and second gears fixed thereto, wherein the first gear meshes with the propulsion input gear;
        a gear output shaft having a third gear fixed thereto, wherein the third gear meshes with the primary drive gear, the gear output shaft further including fourth and fifth gears each located around and supported for rotation on the gear output shaft, wherein the fourth gear meshes with the first gear and wherein the fifth gear meshes with the second gear; and
        a slideable dog hub operably connectable to a gear change selector, wherein the slideable dog hub is located on the gear output shaft in slideable engagement and constrained for rotation therewith, wherein the slideable dog hub is located between the fourth and fifth gears, wherein the at least one drive shaft and the gear change unit are arranged so that the circumference of the fifth gear overlaps the circumference of the primary drive gear.

2. The gearbox according to claim 1, comprising:
    a second propulsion input shaft in driveable communication with the gearbox outputs, wherein one end of the second propulsion input shaft forms a second propulsion input to the gearbox; and
    a second gear reduction unit and/or a second gear change unit in driveable communication with the gearbox outputs, wherein the second propulsion input shaft, the second gear reduction unit and/or the second gear change unit are connected in a parallel connection with an output of the controlled differential to the gearbox outputs, and wherein the or each steering input, the propulsion input and the second propulsion input are located on the same side of the gearbox housing.

3. The gearbox according to claim 2, wherein the propulsion input shaft and the second propulsion input shaft are located in a common plane, and wherein the or each steering input shaft is spaced from the common plane.

4. The gearbox according to claim 1, wherein the or each steering input and the or each propulsion input are spaced from one another.

5. The gearbox according to claim 1, wherein one of the gearbox outputs is located on the same side of the gearbox as the or each steering input and the or each propulsion input.

6. The gearbox according to claim 5, wherein the distances between the center of the gearbox output and the centers of the or each steering input and the or each propulsion input are substantially equal.

7. The gearbox for a skid steered vehicle according to claim 1, wherein the propulsion input shaft and the gear change unit are connected in a parallel connection with an output of the controlled differential to the gearbox outputs.

8. A drive unit for a skid steered vehicle, the drive unit comprising:
the gearbox according to claim 1;
an electric steering motor operatively connected to the steering input; and
an electric propulsion motor operatively connected to the or each propulsion input.

9. The drive unit according to claim 8, wherein the or each electric steering motor is identical to the or each electric propulsion motor.

10. A drive configuration for a skid steered vehicle comprising:
a respective drive member adapted to be located at each side of the vehicle, each drive member engaging with a track or wheel of the vehicle and operable to drive the tracks or wheels of the vehicle; and
the drive unit according to claim 8, wherein each drive member is in driveable communication with an output of the gearbox.

11. A vehicle comprising the drive configuration according to claim 10.

12. A gearbox for a skid steered vehicle, the gearbox comprising:
a housing having first and second opposing sides;
a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs;
one or more steering input shafts in driveable communication with the controlled differential, wherein one end of the or each steering input shaft forms a steering input to the gearbox;
one or more propulsion input shafts in driveable communication with the gearbox outputs, wherein one end of the or each propulsion input shaft forms a propulsion input to the gearbox;
a gear reduction unit and/or a gear change unit in driveable communication with the gearbox outputs, wherein the or each propulsion input shaft, the gear reduction unit and/or the gear change unit are connected in a parallel connection with an output of the controlled differential to the gearbox outputs, and wherein the or each steering input and the or each propulsion input are located on the one side of the gearbox housing; and
the gear change unit including:
an input shaft including a drive input;
an output shaft including a drive output;
a first gear located around and supported for rotation on the output shaft or the input shaft;
a second gear located around and supported for rotation on the same output shaft or input shaft as the first gear;
a third gear located around and supported for rotation on the other of the input or output shafts not supporting the first and second gears;
a slideable dog hub operably connectable to a gear change selector, wherein the slideable dog hub is located on the same output shaft or input shaft as the first and second gears in slideable engagement and constrained for rotation therewith, wherein the slideable dog hub is located between the first and second gears, wherein the gear change unit is configured so that, in use, when the slideable dog hub is engaged with the first gear, drive is transmitted from the drive input to the drive output via a first gear chain not including the second gear, and when the slideable dog hub is engaged with the second gear, drive is transmitted from the drive input to the drive output via a second gear chain including the second and third gears;
a fourth gear located around and supported for rotation on the same output shaft or input shaft as the third gear; and
a second slideable dog hub operably connectable to a gear change selector, wherein the second slideable dog hub is located on the same output shaft or input shaft as the third and fourth gears in slideable engagement and constrained for rotation therewith, wherein the second slideable dog hub is located between the third and fourth gears, wherein the gear change unit is configured so that, in use, when the second slideable dog hub is engaged with the fourth gear the first and second gear chains may be selected by means of the slideable dog hub, and wherein when the second slideable dog hub is engaged with the third gear and the slideable dog hub is engaged with the first gear, drive is transmitted from the drive input to the drive output via a third gear chain not including the second or fourth gears, and when the second slideable dog hub is engaged with the third gear and the slideable dog hub is engaged with the second gear, drive is transmitted from the drive input to the drive output via a fourth gear chain not including the first or fourth gears.

13. A gearbox for a skid steered vehicle, the gearbox comprising:
a housing having first and second opposing sides;
a controlled differential positioned between and connecting two drive shafts and being in driveable communication with each drive shaft, wherein the end of each drive shaft remote from the controlled differential forms an output of the gearbox, wherein outputs from the controlled differential connect directly via the drive shafts to the gearbox outputs such that outputs of the controlled differential attach solidly to and turn at the same speed as the gearbox outputs;
one or more steering input shafts in driveable communication with the controlled differential, wherein one end of the or each steering input shaft forms a steering input to the gearbox;
one or more propulsion input shafts in driveable communication with the gearbox outputs, wherein one end of the or each propulsion input shaft forms a propulsion input to the gearbox;
a gear reduction unit and/or a gear change unit in driveable communication with the gearbox outputs, wherein the or each propulsion input shaft, the gear reduction unit and/or the gear change unit are connected in a parallel connection with an output of the controlled differential to the gearbox outputs, and wherein the or each steering input and the or each propulsion input are located on one side of the gearbox housing;
at least one drive shaft having a primary drive gear fixed thereto;
the propulsion input shaft including a propulsion input and a propulsion input gear fixed thereto; and the gear change unit including,
- a gear input shaft having first and second gears fixed thereto, wherein the first gear meshes with the propulsion input gear;
- a gear output shaft having a third gear fixed thereto, wherein the third gear meshes with the primary drive gear, the gear output shaft further including fourth and fifth gears each located around and supported for rotation on the gear output shaft, wherein the fourth gear meshes with the first gear and wherein the fifth gear meshes with the second gear; and
- a slideable dog hub operably connectable to a gear change selector, wherein the slideable dog hub is located on the gear output shaft in slideable engagement and constrained for rotation therewith, wherein the slideable dog hub is located between the fourth and fifth gears, wherein the at least one drive shaft and the gear change unit arc arranged so that the circumference of the fifth gear overlaps the circumference of the primary drive gear.

* * * * *